United States Patent
Swami et al.

(10) Patent No.: US 10,572,974 B2
(45) Date of Patent: Feb. 25, 2020

(54) IMAGE DEMOSAICER AND METHOD

(71) Applicant: OmniVision Technologies, Inc., Santa Clara, CA (US)

(72) Inventors: Sarvesh Swami, San Jose, CA (US); Yubo Duan, Singapore (SG); Chengming Liu, Fremont, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 108 days.

(21) Appl. No.: 15/950,845

(22) Filed: Apr. 11, 2018

(65) Prior Publication Data

US 2019/0318451 A1    Oct. 17, 2019

(51) Int. Cl.
*G06T 3/40*  (2006.01)
*G06T 7/90*  (2017.01)
*G06T 5/50*  (2006.01)

(52) U.S. Cl.
CPC .............. *G06T 3/4015* (2013.01); *G06T 5/50* (2013.01); *G06T 7/90* (2017.01); *G06T 2207/20216* (2013.01); *G06T 2207/20224* (2013.01)

(58) Field of Classification Search
CPC .......... G06T 3/4015; G06T 5/50; G06T 7/90; G06T 2207/20216; G06T 2207/20224
See application file for complete search history.

(56) References Cited

U.S. PATENT DOCUMENTS 6,791,609 B2 * 9/2004 Yamauchi ................. G06T 1/60
                                                   348/273
7,643,676 B2 * 1/2010 Malvar ................. G06T 3/4015
                                                   382/162

(Continued)

OTHER PUBLICATIONS

Chun-Ye Su, et al., "Effective Demosaicing using subband correlation", Apr. 17, 2009 (Year: 2009).*

(Continued)

*Primary Examiner* — Ming Y Hon
(74) *Attorney, Agent, or Firm* — Lathrop GPM LLP

(57) ABSTRACT

A method for demosaicing a raw image includes: (1) horizontally-interpolating a green channel formed of primary pixel-values $B_g(x,y)_g$ to yield a horizontally-interpolated green channel that includes both $B_g(x,y)_g$ and non-primary pixel-values $I_{gh}(x,y)_{r,b}$; (2) modifying each $I_{gh}(x,y)_{r,b}$ by horizontally-neighboring pixel-values, to yield a refined horizontally-interpolated green channel; (3) vertically-interpolating the green channel to yield a vertically-interpolated green channel that includes pixel-values $I_{gv}(x,y)_{r,b}$; (4) modifying each $I_{gv}(x,y)_{r,b}$ by vertically-neighboring pixel-values, to yield a refined vertically-interpolated green channel; (5) generating a full-resolution green channel from the refined interpolated green channels and gradients thereof; (6) generating a full-resolution red channel by determining red pixel-values from a local-red mean value of neighboring pixel-values and the full-resolution green channel; (7) generating a full-resolution blue channel by determining pixel-values from a local-blue mean value of neighboring pixel-values and the full-resolution green channel; and (8) combining the full-resolution channels to yield a demosaiced raw image.

20 Claims, 12 Drawing Sheets

(56) References Cited

U.S. PATENT DOCUMENTS

| | | | | |
|---|---|---|---|---|
| 7,825,965 B2* | 11/2010 | Achong | ............... | H04N 9/045 |
| | | | | 348/246 |
| 8,165,389 B2* | 4/2012 | Malvar | ............... | G06T 3/4015 |
| | | | | 382/162 |
| 8,170,331 B2* | 5/2012 | Shi | ............... | H04N 9/045 |
| | | | | 382/162 |
| 8,638,342 B2* | 1/2014 | Cote | ............... | G06T 3/4015 |
| | | | | 345/597 |
| 9,113,118 B2* | 8/2015 | Silverstein | ............... | H04N 9/73 |
| 2011/0090242 A1 | 4/2011 | Côté et al. | | |
| 2017/0085818 A1 | 3/2017 | Ayers et al. | | |

OTHER PUBLICATIONS

He et al. (2013) "Guided Image Filtering," in IEEE Transactions on Pattern Analysis and Machine Intelligence, vol. 35, No. 6, pp. 1397-1409.

Taiwan Patent Application No. 108111554, English translation of Office Action dated Dec. 6, 2019, 4 pages.

\* cited by examiner horizontally-interpolated green channel 800

FIG. 8 vertically-interpolated green channel 900

FIG. 9

IMAGE DEMOSAICER AND METHOD

BACKGROUND

Many consumer electronics products include at least one camera. These products include tablet computers, mobile phones, and smart watches. In such products, and in digital still cameras themselves, images and video captured in low-light environments suffer from low signal-to-noise ratio, which limits image and video quality. High-dynamic range images also face this problem, for example, in low-luminosity regions of the image.

SUMMARY OF THE EMBODIMENTS

Embodiments disclosed herein ameliorate said image quality problems resulting from relatively low illumination. In one aspect, a method for demosaicing a raw image captured by an image sensor is disclosed. The image sensor includes a pixel array and a Bayer-pattern color-filter array (CFA) having a plurality of red color filters $CF_r$, green color filters $CF_g$, and blue color filters $CF_b$ each covering a respective one of a plurality of pixel sub-arrays of the pixel array. The pixel array including a plurality of pixels $p(x,y)_\alpha$ located at a respective one of a plurality of coordinates $(x,y)_\alpha$, and beneath a color filter $CF_\alpha$, and each generating a respective one of a plurality of primary pixel-values $B_\alpha(x,y)_\alpha$, where $\alpha$ is one of r, g, and b. The method includes the following steps denoted 1-8:

(1) horizontally-interpolating a green channel, of the raw image, formed of primary pixel-values $B_g(x,y)_g$ of the plurality of primary pixel-values $B_\alpha(x,y)_\alpha$, to yield a horizontally-interpolated green channel that includes both primary pixel-values $B_g(x,y)_g$ and non-primary pixel-values $I_{gh}(x,y)_{r,b}$;

(2) modifying each non-primary pixel-value $I_{gh}(x,y)_{r,b}$ by a plurality of horizontally-neighboring non-primary pixel-values $I_{gh}(x,y)_{r,b}$, to yield a refined horizontally-interpolated green channel;

(3) vertically-interpolating the green channel to yield a vertically-interpolated green channel that includes both primary pixel-values $B_g(x,y)_g$ and non-primary pixel-values $I_{gv}(x,y)_{r,b}$;

(4) modifying each non-primary pixel-value $I_{gv}(x,y)_{r,b}$ by a plurality of vertically-neighboring non-primary pixel-values $I_{gv}(x,y)_{r,b}$, to yield a refined vertically-interpolated green channel;

(5) generating a full-resolution green channel from the refined horizontally-interpolated green channel, refined vertically-interpolated green channel, a horizontal-gradient of the horizontally-interpolated green channel, and a vertical-gradient of the vertically-interpolated green channel;

(6) generating a full-resolution red channel by determining a plurality of non-primary red pixel-values $I_r(x_r,y_r)_{g,b}$, each corresponding to a respective one of the plurality of coordinates $(x_r,y_r)_{g,b}$, from a local-red mean value of neighboring red primary pixel-values $B_r(x,y)_r$ and the full-resolution green channel;

(7) generating a full-resolution blue channel by determining a plurality of non-primary blue pixel-values $I_b(x_r,y_r)_{g,r}$, each corresponding to a respective one of the plurality of coordinates $(x_r,y_r)_{g,r}$, from a local-blue mean value of neighboring blue primary pixel-values $B_b(x,y)_b$ and the full-resolution green channel; and (8) combining the full-resolution red channel, the full-resolution green channel, and the full-resolution blue channel to yield a demosaiced raw image.

In a second aspect, an image demosaicer for demosaicing a raw image includes a memory and a microprocessor. The raw image is captured by the image sensor of the aforementioned method. The memory stores non-transitory computer-readable instructions and is adapted to store the raw image. The microprocessor is adapted to execute the instructions to execute steps 1-8 of the aforementioned method.

BRIEF DESCRIPTION OF THE FIGURES

FIGS. 8 and 9 illustrate a horizontally-interpolated green channel and a vertically-interpolated green channel, respectively, generated by the image demosaicer of FIG. 7, in an embodiment.

DETAILED DESCRIPTION OF THE EMBODIMENTS

Figure 1:
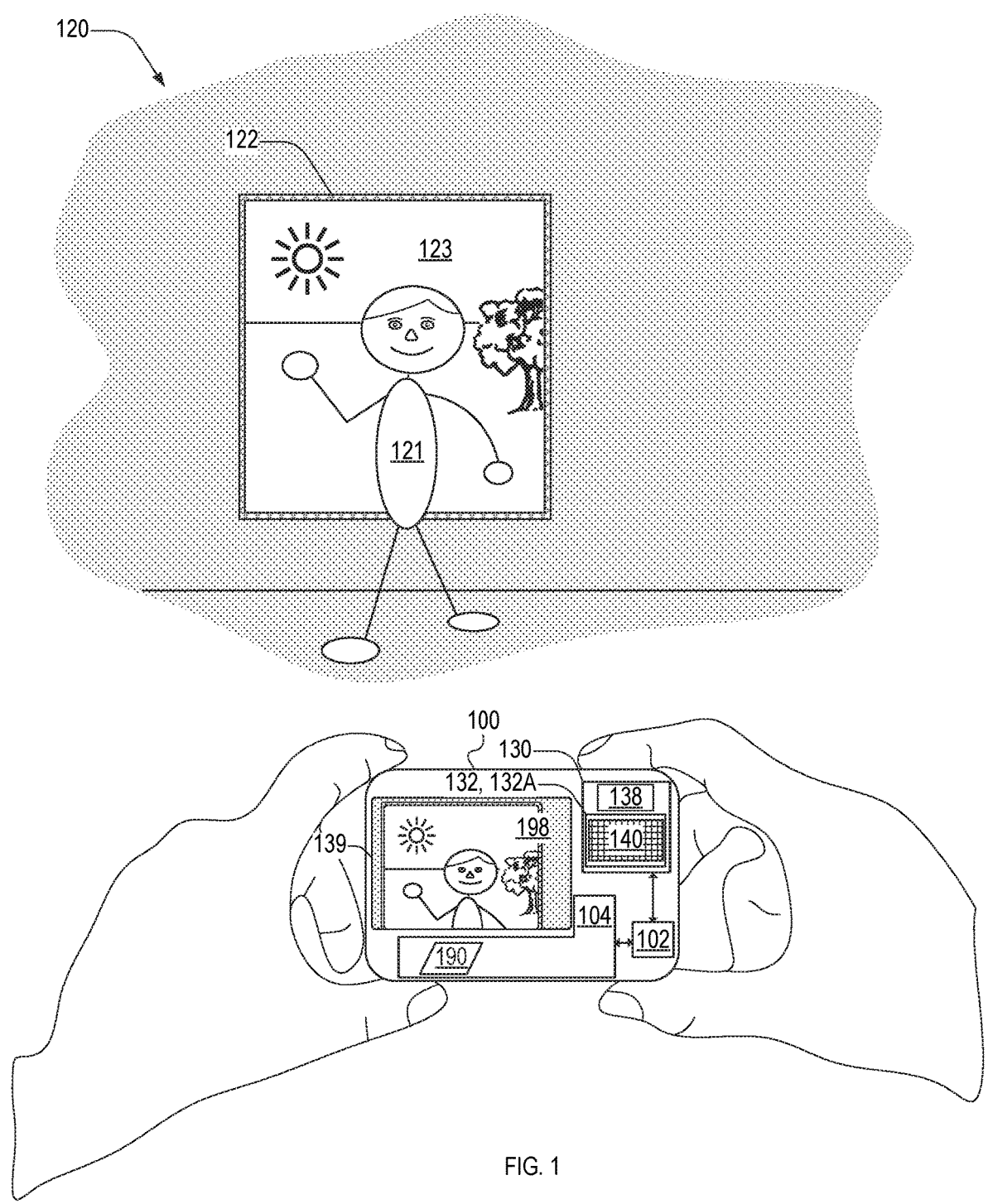
FIG. 1 depicts a scene imaged by a camera that includes an image sensor, which includes a pixel array.

FIG. 1 depicts a camera 100 imaging a scene 120 having a high dynamic range of luminance. Scene 120 includes a person 121 in front of a window 122, through which a sunny scene 123 is visible. Camera 100 includes an imaging lens (not shown), an image sensor 130, a memory 104, and a microprocessor 102 communicatively coupled to image sensor 130. Image sensor 130 includes a pixel array 132A, which may have a color filter array (CFA) 140 thereon. Pixel array 132A includes a plurality of pixels 132, not shown in FIG. 1 for clarity of illustration. Each color filter of CFA 140 may be aligned with a respective pixel 132 of pixel array 132A or with a center of a respective pixel sub-array of pixel array 132A. A pixel sub-array is, for example, a m×n array of pixels 132, where m and n are integers, at least one of which is greater than one. The imaging lens images scene 120 onto image sensor 130. Image sensor 130 also includes circuitry 138 that includes at least one analog-to-digital converter.

Each pixel 132 has a respective pixel charge corresponding to a respective intensity of light from a scene 120 imaged onto pixel array 132A. Circuitry 138 converts each pixel charge to a respective one of a first plurality of pixel-values of a raw image 190, which is stored in memory 104. Camera 100 may include a display 139 configured to display a demosaiced version of raw image 190 as a demosaiced image 198.

In scene 120, indoor lighting, not shown, illuminates the front of person 121 facing the camera while sunlight illuminates sunny scene 123. Hence, person 121 and sunny scene 123 have respective differing luminosities. Since the direct sunlight is typically significantly brighter than the indoor lighting, luminosity of sunny scene 123 far exceeds luminosity of person 121 such that scene 120 has a high dynamic range of luminosity. Standard digital imaging enables capture of scene 120 using a single exposure time optimized for either (but not both) luminosity of person 121 or sunny scene 123. Even when the exposure time is optimized for luminosity of person 121, the exposure time may be too long to capture of clear image of person 121, e.g., if person 121 is moving.

Figure 2:
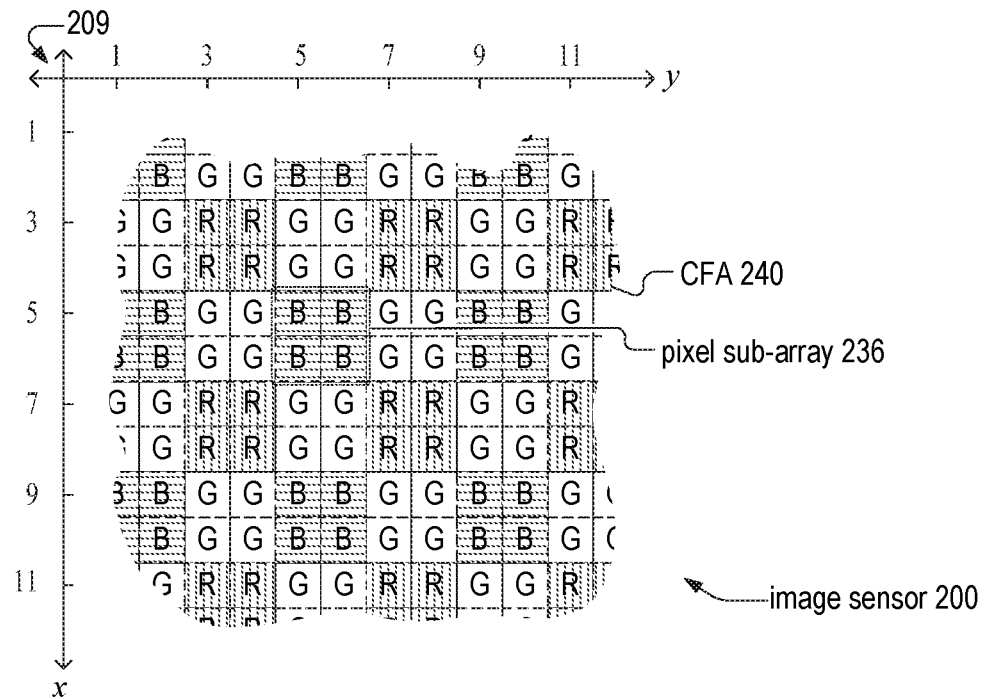
FIG. 2 is a schematic plan view of a region of an image sensor that includes the pixel array of FIG. 1, and a four-cell Bayer color filter array (CFA) thereon, in an embodiment.

FIG. 2 is a schematic plan view of a region of an image sensor 200 that includes pixel array 132A and a four-cell Bayer CFA 240 thereon, hereinafter CFA 240. Image sensor 200 and CFA 240 are examples of image sensor 130 and CFA 140 respectively. The two-by-two grouping of red, green, and blue color filter regions results in image sensor 200 having a low-light response resembling that of an image sensor with larger pixels, and hence requires a shorter exposure time for sufficient exposure of person 121. However, a shortcoming of such a color filter array is lost image resolution. Embodiments disclosed herein restore this lost image resolution.

Image sensor 200 and CFA 240 are positioned with respect to an x-y coordinate system 209. Coordinates (x,y) denote locations of each color filter and pixel therebeneath, where the origin of coordinate system 209 (x=y=0) may correspond to any pixel within pixel array 132A. Herein, all coordinates are expressed as (x,y) coordinates, that is, with the x value being listed first. Also, herein, the notation α(i,j) refers to a color filter at coordinates (i,j), where α denotes a transmission spectrum of a color filter and i and j are integers. For example, α is one of r, g, b, c, m, y, and k which represent, respectively, red, green, blue, cyan, magenta, yellow, and clear (panchromatic) color filters. A subscript on a coordinate pair indicates the type color filter, of CFA 240, covering a pixel 132 located at the coordinate. For example, pixel $p(x,y)_\alpha$ denotes a pixel 132, located at coordinate (x,y), that is covered by a color filter with a transmission spectrum denoted by α. The pixel $p(x,y)_\alpha$ generates a primary pixel-value $B_\alpha(x,y)$.

CFA 240 includes a plurality of red (R), green (G), and blue (B) color filters arranged in a four-cell Bayer pattern. In a conventional Bayer-pattern CFA aligned with a pixel array, each color filter is aligned with a respective pixel of the pixel array. A conventional Bayer pattern may be viewed as a "single-cell Bayer pattern." In a CFA having a four-cell Bayer pattern, a four-pixel sub-array of the pixel array may be beneath one color filter of the same color.

In CFA 240, each color filter may be aligned with a two-by-two pixel sub-array of pixel array 132A. For example, pixel array 132A includes a pixel sub-array 236 formed of four pixels 132 located at a respective one of four coordinates (5,5), (6,5), (5, 6), and (6,6) hereinafter coordinates $C_1$. CFA 240 includes a blue color filter aligned to pixels 132 that constitute pixel sub-array 236. This blue color filter may be a single continuous optical element, or include a plurality of optical elements, such as four distinct optical elements arranged in a two-by-two array. Similarly, CFA 240 includes red and green color filters each aligned with a respective two-by-two pixel sub-array of pixel array 132A.

Figure 3:
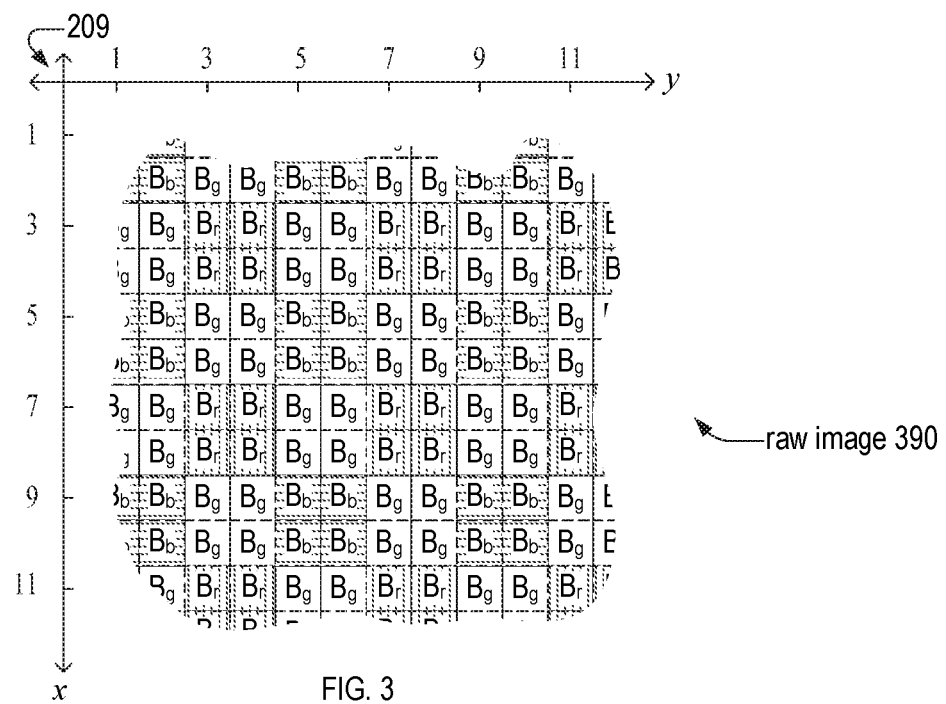
FIG. 3 is a schematic plan view of a region of a raw image corresponding to the region of the pixel array illustrated in FIG. 2.

FIG. 3 is a schematic plan view of a region of a raw image 390 corresponding to the region of pixel array 132A illustrated in FIG. 2. Raw image 390 is an example of raw image 190, and includes a plurality of primary pixel-values $B_r$, a plurality of primary pixel-values $B_g$, and a plurality of primary pixel-values $B_b$.

Each primary pixel-value $B_r$ is generated by a respective pixel 132 beneath a red color filter of CFA 140. Each primary pixel-value $B_g$ is generated by a respective pixel 132 beneath a green color filter of CFA 140. Each primary pixel-value $B_b$ is generated by a respective pixel 132 beneath a blue color filter of CFA 140. For example, primary pixel-values $B_r$, $B_g$, and $B_b$ at respective coordinates (3,4), (3,6), and (5,6) are generated by respective pixels of image sensor 200 at the same respective coordinates (3,4), (3,6), and (5,6). Expressed more concisely, and introducing a notational convention used herein, primary pixel-values $B_r(3,4)$, $B_b(3,6)$, and $B_g(5,6)$ are generated by respective pixels $p(3,4)_r$, $p(3,6)_g$, and $p(5,6)_b$ of image sensor 200.

Figure 4:
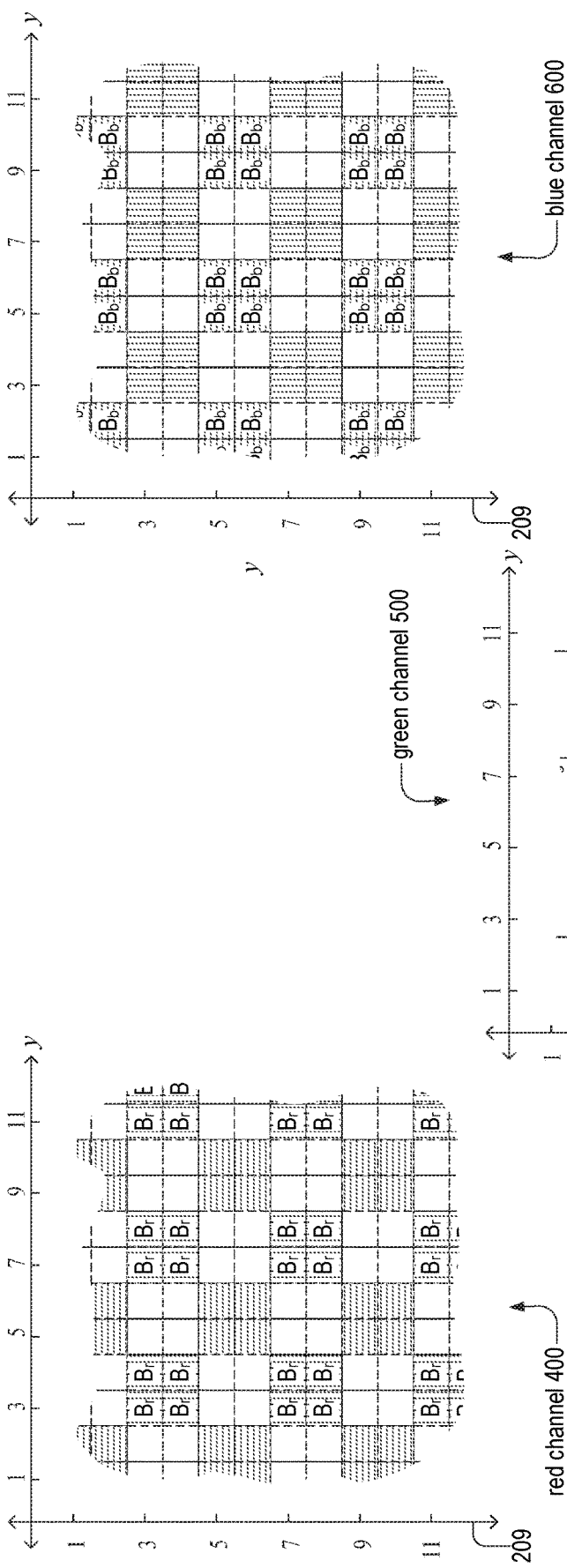
FIGS. 4, 5, and 6 illustrate, respectively, a schematic view of a red channel, a green channel, and a blue channel generated from the raw image of FIG. 3, in an embodiment.
Figure 5:
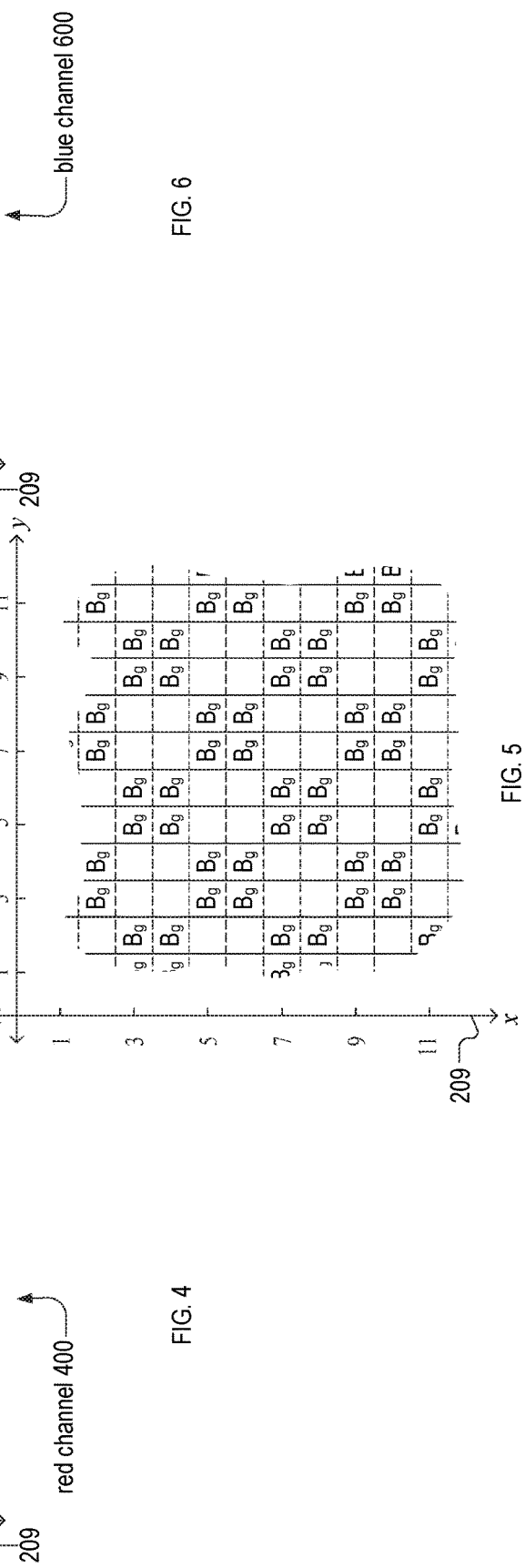
Figure 6:
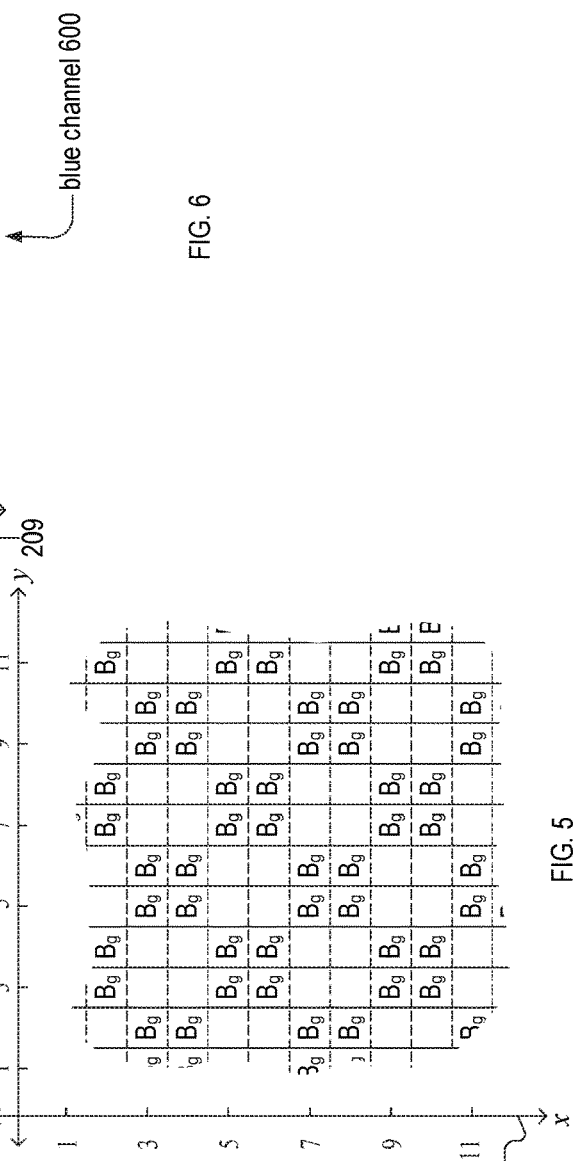

FIGS. 4-6 illustrate, respectively, a schematic view of a red channel 400, a green channel 500, and a blue channel 600 generated from raw image 390. Channels 400, 500, and 600 are each illustrated with respect to x-y coordinate system 209. Red channel 400 includes primary pixel-values $B_r$ of raw image 390 at locations corresponding to red color filters of CFA 240. Green channel 500 includes primary pixel-values $B_g$ of raw image 390 at locations corresponding to green color filters of CFA 240. Blue channel 600 includes primary pixel-values $B_b$ of raw image 390 at locations corresponding to blue color filters of CFA 240.

Figure 7:
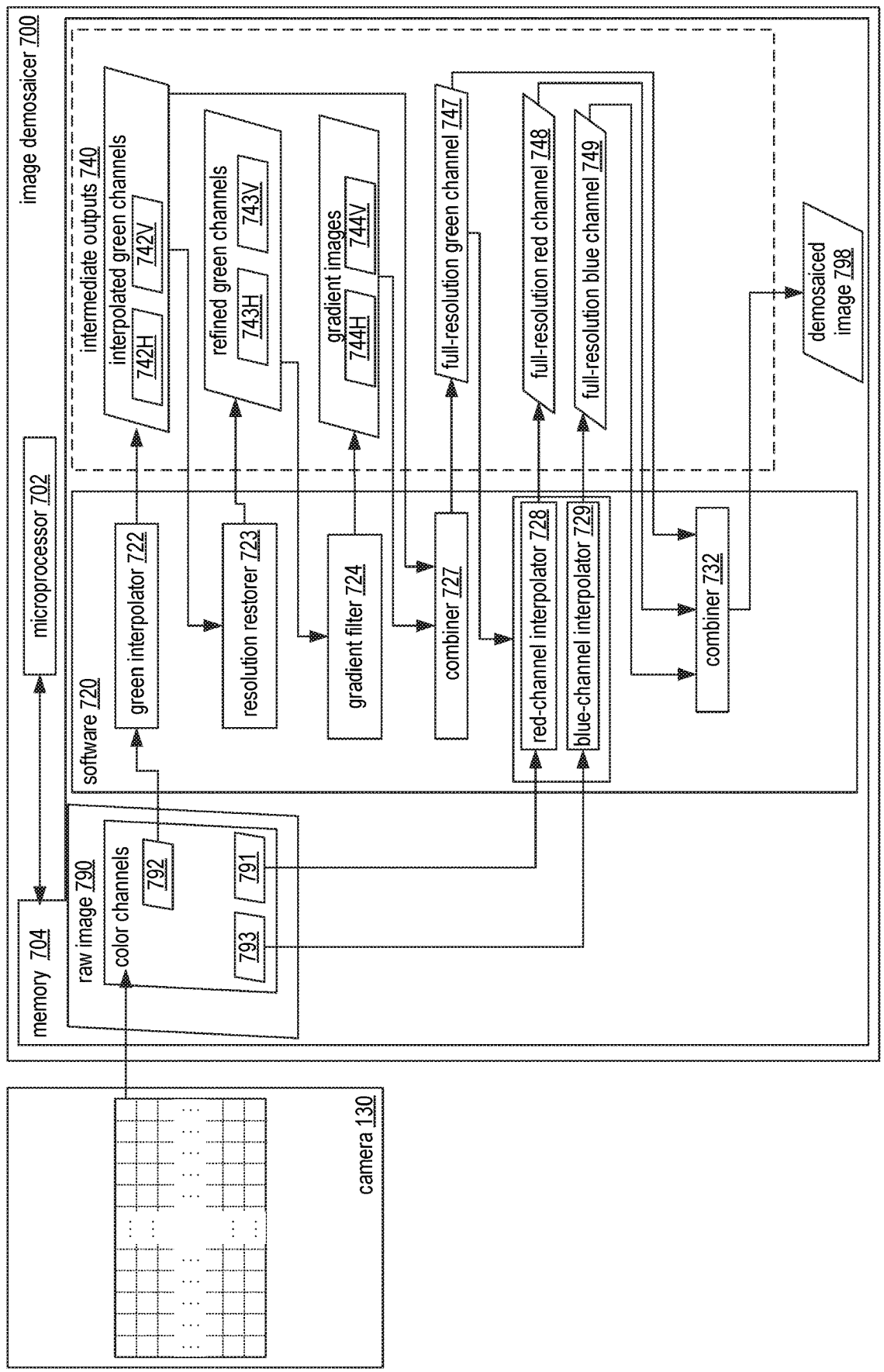
FIG. 7 is a schematic functional block diagram of an image demosaicer configured to generate a demosaiced image from raw the image of FIG. 3.

FIG. 7 is a schematic functional block diagram of an image demosaicer 700 configured to generate, from raw image 790, a demosaiced image 798. Image demosaicer 700 may be implemented within camera 100. Raw image 390, FIG. 3, is an example of raw image 790.

Image demosaicer 700 includes a microprocessor 702 and a memory 704 that stores software 720 that includes computer-readable instructions. Microprocessor 702 may be a digital signal processor such as an image processor. Memory 704 may be transitory and/or non-transitory and may include one or both of volatile memory (e.g., SRAM, DRAM, VRAM, or any combination thereof) and nonvolatile memory (e.g., FLASH, ROM, magnetic media, optical media, or any combination thereof).

Memory 704 and microprocessor 702 may function as memory 104 and microprocessor 102, respectively, of camera 100, FIG. 1. Microprocessor 702 is adapted to execute the instructions to perform functions of image demosaicer 700 as described herein. Memory 704 may store at least one of raw image 790, software 720, and intermediate outputs 740.

Raw image 790 includes color channels 791, 792, and 793. Examples of color channels 791, 792, and 793 are, respectively, red channel 400, green channel 500, and blue channel 600. Software 720 includes one or more of the following software modules that when executed by microprocessor 702 produce respective data outputs: a green-channel interpolator 722, a resolution restorer 723, a gradient filter 724, a combiner 727, a red-channel interpolator 728, a blue-channel interpolator 729, and a combiner 732.

Green-channel interpolator 722 is configured to interpolate color channel 792 to yield a horizontally-interpolated green channel 742H and vertically-interpolated green channel 742V. Resolution restorer 723 produces a refined green channel 743H and a refined green channel 743V from, respectively, horizontally-interpolated green channel 742H and vertically-interpolated green channel 742V. Gradient filter 724 produces a gradient image 744H and a gradient image 744V from, respectively, horizontally-interpolated green channel 742H and vertically-interpolated green channel 742V. Gradient images 744H and 744V may be obtained by applying a gradient filter to channels 743H and 743V, respectively. Alternatively, gradient images 744H and 744V may be obtained by applying a gradient filter to channels 742H and 742V, respectively. Combiner 727 produces a full-resolution green channel 747 from refined green channels 743H and 743V. Red-channel interpolator 728 generates full-resolution red channel from full-resolution green channel 747 and color channel 791. Blue-channel interpolator 729 generates full-resolution blue channel from full-resolution green channel 747 and color channel 793. Combiner 732 combines full-resolution channels 747, 748, and 79 to form demosaiced image 798.

Luminance Interpolation

FIGS. 8 and 9 are schematic plan views of a region of a horizontally-interpolated green channel 800 and a vertically-interpolated green channel 900, respectively. Interpolated channels 800 and 900 are examples of interpolated channels 742H and 742V, respectively. Interpolated channel 800 includes a plurality of primary pixel-values $B_g(x,y)_g$, and a plurality of green pixel-values $801(x,y)_r$, and a plurality of green pixel-values $803(x,y)_b$. Coordinates $(x,y)_r$ and $(x,y)_b$ correspond to, respectively, locations of red color filters and blue color filters of CFA 240. Green pixel-values $801(x,y)_r$ and $803(x,y)_b$ are interpolated from horizontally-adjacent primary pixel-values $B_g(x,y)_g$ of green channel 500. For example, non-primary pixel-value $803(6,5)_b$ is interpolated from at least two primary pixel-values $B_g(6,y\ne 5)_g$. Green pixel-values $801(x,y)_r$ and $803(x,y)_b$ are each examples of non-primary pixel-values because they are part of interpolated green channel 800 at coordinates (x,y) beneath non-green color filters.

Interpolated channel 900 includes a plurality of primary pixel-values $B_g(x,y)_g$ and a plurality of green pixel-values $901(x,y)_r$, and a plurality of green pixel-values $903(x,y)_b$. Green pixel-values $901(x,y)_r$ and $903(x,y)_b$ are interpolated from vertically-adjacent primary pixel-values $B_g(x,y)_g$. For example, green pixel-value $903(6,5)_b$ is interpolated from at least two primary pixel-values $B_g(x\ne 6,5)_g$. Green pixel-values $901(x,y)_r$ and $903(x,y)_b$ are each examples of non-primary pixel-values because they are part of interpolated green channel 900 at coordinates (x,y) beneath non-green color filters.

Both interpolated channels 800 and 900 may be logarithmically interpolated from green channel 500. For example, the logarithms of interpolated pixel-values 801, 803, 901, and 903 may be interpolated from logarithms of primary pixel-values $B_g(x,y)_g$ of green channel 500. Logarithmic interpolation enables accurate interpolation without requiring information about white balance and illumination associated with raw image 390. Interpolating logarithms of pixel-values also more heavily weights smaller pixel-values than does interpolating pixel-values themselves, which contributes to accurate gradient detection unperturbed by high-pixel-value noise.

Figure 10:
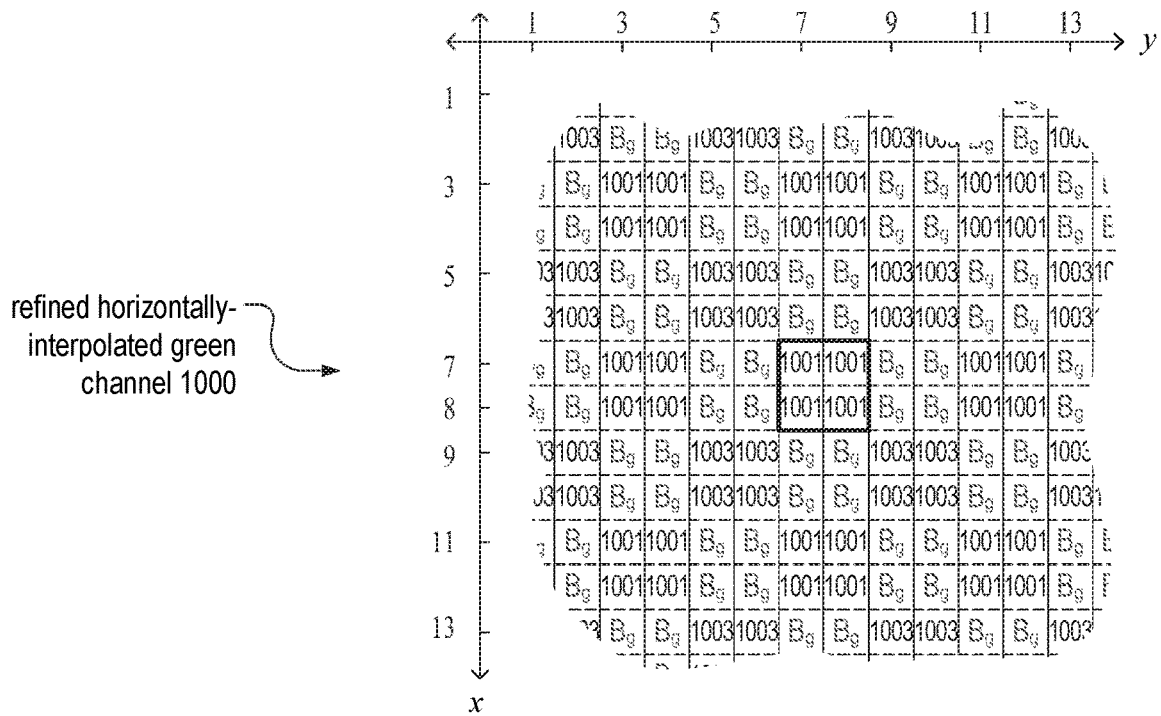
FIGS. 10 and 11 illustrate refined versions of the interpolated green channels of FIG. 8 and FIG. 9, respectively, generated by the image demosaicer of FIG. 7, in an embodiment.
Figure 11:
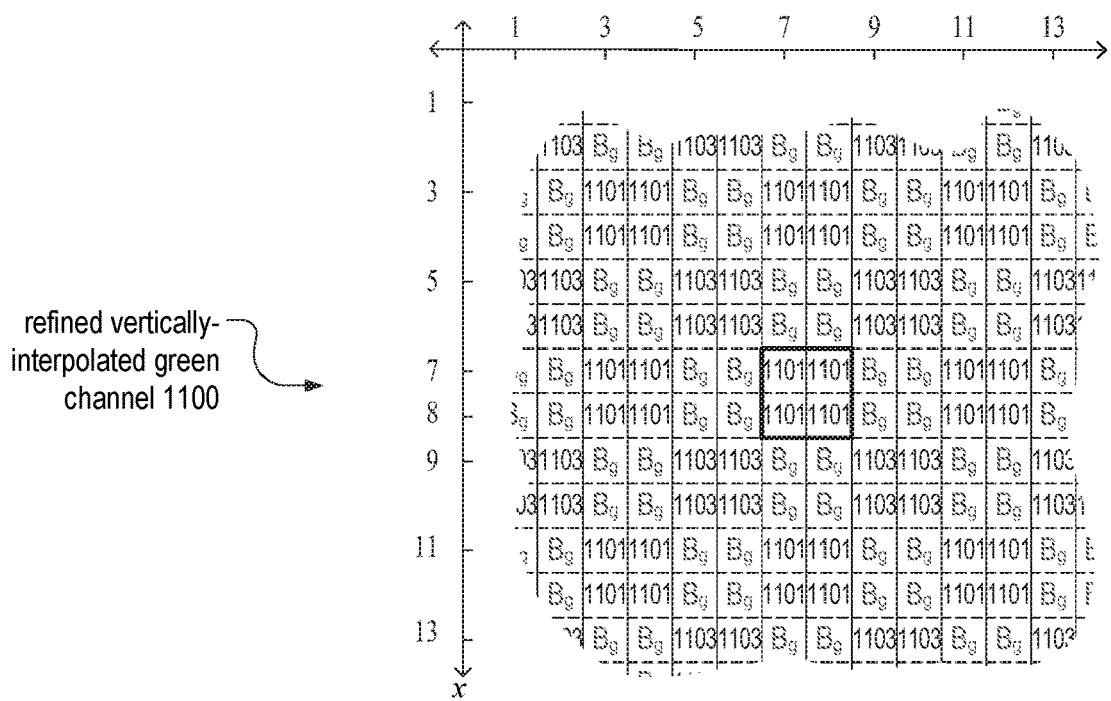

FIGS. 10 and 11 are schematic plan views of a region of a refined horizontally-interpolated green channel 1000 and a refined vertically-interpolated green channel 1100, respectively. Refined green channels 1000 and 1100 are examples of refined green channels 743H and 743V, respectively.

Refined green channel 1000 includes the following green pixel-values: primary pixel-values $B_g(x,y)_g$ of raw image 390, a plurality of green pixel-values $1001(x,y)_r$, and a plurality of green pixel-values $1003(x,y)_b$. Each green pixel-value $1001(x,y)_r$ may be equal to a sum of green pixel-value $801(x,y)_r$ and a red horizontal-supplement $H_r(x,y)$, as shown by equation 1. Each green pixel-value 1003 $(x,y)_b$ may be equal to a sum of green pixel-value $803(x,y)_b$ and a blue horizontal-supplement $H_b(x,y)$, as shown by equation 2.

$$1001(x,y)_r = 801(x,y)_r + H_r(x,y) \quad (1)$$

$$1003(x,y)_b = 803(x,y)_b + H_b(x,y) \quad (2)$$

Refined green channel 1100 includes the following green pixel-values: plurality of primary pixel-values $B_g(x,y)_g$ of raw image 390, a plurality of green pixel-values $1101(x,y)_r$, and a plurality of green pixel-values $1103(x,y)_b$. Each green pixel-value $1101(x,y)_r$ may be equal to a sum of green pixel-value $901(x,y)_r$ and a red vertical-supplement $V_r(x,y)$, as shown by equation 3. Each green pixel-value $1103(x,y)_b$ may be equal to a sum of green pixel-value 903 $(x,y)_b$ and a blue vertical-supplement $V_b(x,y)$, as shown by equation 4.

$$1101(x,y)_r = 901(x,y)_r + V_r(x,y) \quad (3)$$

$$1103(x,y)_b = 903(x,y)_b + V_b(x,y) \quad (4)$$

Coordinate (x,y) of horizontal-supplements $H(x,y)$ and vertical-supplements V (x,y) corresponds to an m×n pixel sub-array of pixel array 132A, discussed above regarding image sensor 200 and CFA 240. For example, FIGS. 10 and 11 include a two-by-two subarray, surrounded by a thick box, of green pixel-values 1001 and 1101 at (x,y)=({7,8}, {7,8}). FIGS. 12-15 graphically illustrate pixel-values involved in computing, respectively, red horizontal-supplement $H_r(x,y)$, red vertical-supplement $V_r(x,y)$, blue horizontal-supplement $H_b(x,y)$, and blue vertical-supplement $V_b(x,y)$.

Figure 12:
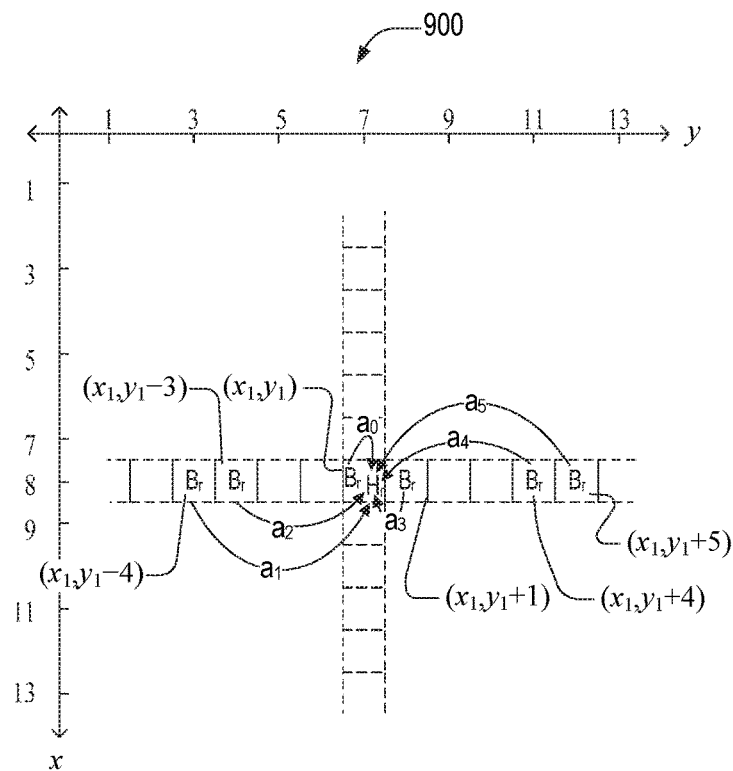
FIGS. 12-15 graphically illustrate pixel-values involved in computing, horizontal-supplements and vertical-supplements used to produce the refined green channels of FIGS. 10 and 11, in an embodiment.

As FIG. 12 illustrates, red horizontal-supplement $H_r(x,y)$ is a linear combination of
 (a) $B_r(x,y)$,
 (b) primary pixel-values $B_r(x,y_1)$ of horizontally-adjacent pixels $p(x,y_1)$ beneath the target pixel sub-array, and
 (c) primary pixel-values $B_r(x,y_2)$ of horizontally-collinear pixels $p(x,y_2)$ beneath red color filters of the pair of neighboring source pixel sub-arrays.

Horizontal coordinates $y_1$ and $y_2$ may satisfy $|y-y_1|<n$ and $|y-y_2|\ge n$.

The following example of horizontal-supplement $H_r(x,y)$ applies to coordinate $(x_1,y_1)_r$, which corresponds to pixel $p(x_1,y_1)_r$ beneath a red color filter of CFA 240. Horizontal-supplement $H_r(x_1,y_1)_r$ may be expressed as:

$$H_r(x_1,y_1)_r = \alpha_0 B_r(x_1,y_1)_r - \alpha_1 B_r(x_1,y_1-4)_r - \alpha_2 B_r(x_1,y_1-3)_r - \alpha_3 B_r(x_1,y_1+1)_r - \alpha_4 B_r(x_1,y_1+4)_r - \alpha_5 B_r(x_1,y_1+5)_r.$$

Green pixel-value 1001$(x_1,y_1)_r$ may equal the sum of green pixel-value 801$(x_1,y_1)_r$ and horizontal-supplement $H_r(x_1,y_1)_r$. Coefficients $\alpha_{0-5}$ are, for example: $\alpha_0=4$, $\alpha_{1-4}=1$, $\alpha_5=0$. FIG. 12 graphically illustrates the above expression for horizontal-supplement $H_r(x_1,y_1)_r$, where $x_1=8$ and $y_1=7$.

Figure 13:
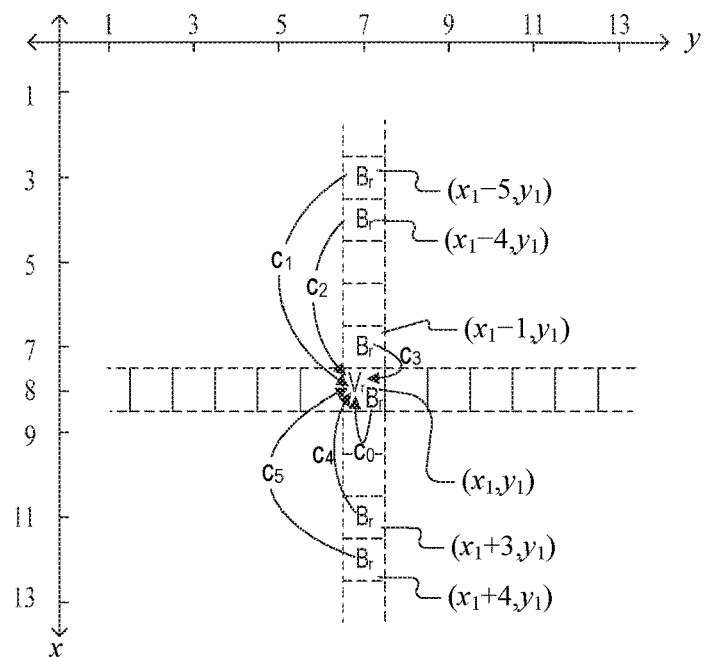

As FIG. 13 illustrates, red vertical-supplement $V_r(x,y)$ is a linear combination of:

(a) $B_r(x,y)$, (b) primary pixel-values $B_r(x_1,y)$ of vertically-adjacent pixels $p(x_1,y)$ beneath the target pixel sub-array, and (c) primary pixel-values $B_r(x_2,y)$ of vertically-collinear pixels $p(x_2,y)$ beneath red color filters of the pair of neighboring source pixel sub-arrays.

Vertical coordinates $x_1$ and $x_2$ may satisfy $|x-x_1|<m$ and $|x-x_2|\geq m$.

The following example of vertical-supplement $V_r(x,y)$ applies to coordinate $(x_1,y_1)_r$. Vertical-supplement $V_r(x_1,y_1)_r$ may be expressed as:

$$V_r(x_1,y_1)_r = c_0 B_r(x_1,y_1)_r - c_1 B_r(x_1-5,y_1)_r - c_2 B_r(x_1-4,y_1)_r - c_3 B_r(x_1-1,y_1)_r - c_4 B_r(x_1+3,y_1)_r - c_5 B_r(x_1+4,y_1)_r.$$

Green pixel-value 1101$(x_1,y_1)_r$ may equal the sum of green pixel-value 901$(x_1,y_1)_r$ and vertical-supplement $V_r(x_1,y_1)_r$. Coefficients $c_{0-5}$ are, for example: $c_0=4$, $c_1=0$, and $c_{2-5}=1$. FIG. 13 graphically illustrates the above expression for vertical-supplement $V_r(x_1,y_1)_r$, where, as in FIG. 12, $x_1=8$ and $y_1=7$.

Without departing from the scope hereof, Supplements $H_r(x,y)$ and $V_r(x,y)$ may include non-zero terms for pixel-values $B_r(x,y)_r$ further away from coordinate $(x_1,y_1)$ than those indicated above.

Figure 14:
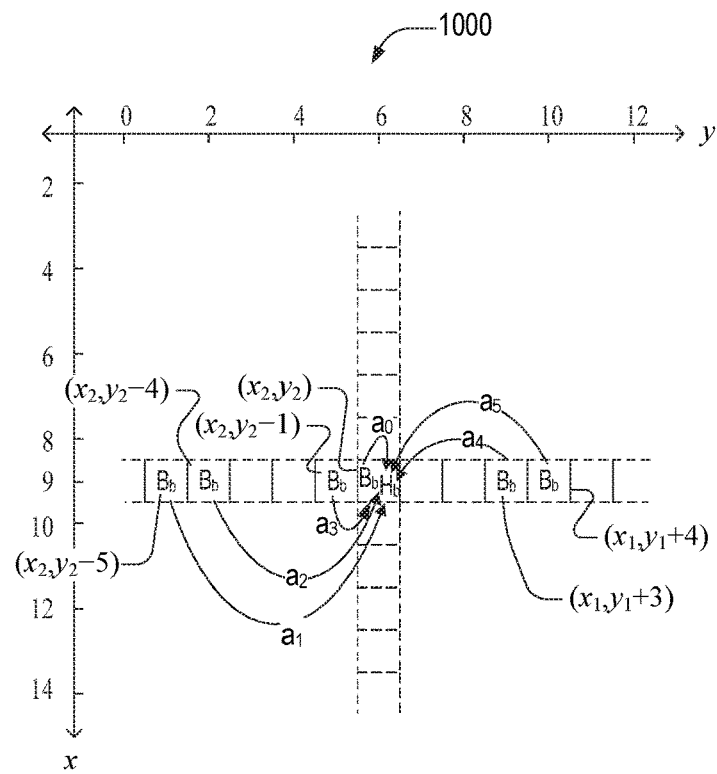

As FIG. 14 illustrates, blue horizontal-supplement $H_b(x,y)$ is a linear combination of:

(a) $B_b(x,y)$ (b) primary pixel-values $B_b(x,y_1)$ of horizontally-adjacent pixels $p(x,y_1)$ beneath the target pixel sub-array, and (c) primary pixel-values $B_b(x,y_2)$ of horizontally-collinear pixels $p(x,y_2)$.

Horizontal coordinates $y_1$ and $y_2$ may satisfy $|y-y_1|<n$ and $|y-y_2|\geq n$.

The following example of horizontal-supplement $H_b(x,y)$ applies to coordinate $(x_2,y_2)_b$, which corresponds to pixel $p(x_2,y_2)_b$ beneath a blue color filter of CFA 240. Horizontal-supplement $H_b(x_2,y_2)_b$ may be expressed as:

$$H_b(x_2,y_2)_b = \alpha_0 B_b(x_2,y_2)_b - \alpha_1 B_b(x_2,y_2-5)_b - \alpha_2 B_b(x_2,y_2-4)_b - \alpha_3 B_b(x_2,y_2-1)_b - \alpha_4 B_b(x_2,y_2+3)_b - \alpha_5 B_b(x_2,y_2+4)_b.$$

Green pixel-value 1001$(x_2,y_2)_b$ may equal the sum of green pixel-value 803 $(x_2,y_2)_b$ and horizontal-supplement $H_b(x_2,y_2)_b$. Coefficients $\alpha_{0-5}$ are, for example: $\alpha_0=4$, $\alpha_{1-4}=1$, $\alpha_5=0$. FIG. 14 graphically illustrates the above expression for horizontal-supplement $H_b(x_2,y_2)_b$, where $x_2=9$ and $y_2=6$.

Figure 15:
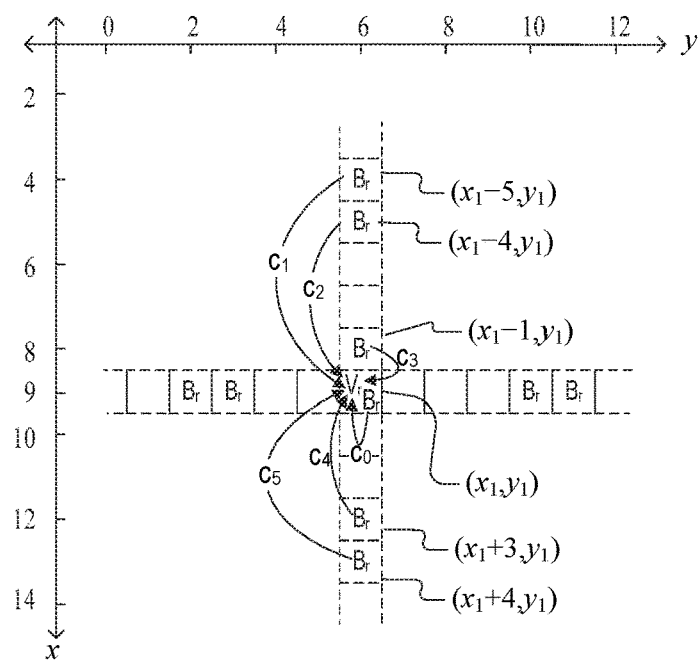

As FIG. 15 illustrates, blue vertical-supplement $V_b(x,y)$ is a linear combination of:

(a) $B_b(x,y)$, (b) primary pixel-values $B_b(x_1,y)$ of vertically-adjacent pixels $p(x_1,y)$ beneath the target pixel sub-array, and (c) primary pixel-values $B_b(x_2,y)$ of vertically-collinear pixels $p(x_2,y)$ beneath blue color filters of the pair of neighboring source pixel sub-arrays.

Vertical coordinates $x_1$ and $x_2$ satisfy $|x-x_1|<m$ and $|x-x_2|\geq m$.

The following example of vertical-supplement $V_b(x,y)$ applies to coordinate $(x_2,y_2)_b$. Vertical-supplement $V_b(x_2,y_2)_b$ may be expressed as:

$$V_b(x_2,y_2)_b = c_0 B_b(x_2,y_2)_b - c_1 B_b(x_2-5,y_2)_b - c_2 B_b(x_2-y_2)_b - c_3 B_b(x_2+1,y_2)_b - c_4 B_b(x_2+3,y_2)_b - c_5 B_b(x_2+4,y_2)_b.$$

Green pixel-value 1101$(x_2,y_2)_b$ may equal the sum of green pixel-value 901$(x_2,y_2)_b$ and vertical-supplement $V_b(x_2,y_2)_b$. Coefficients $c_{0-5}$ are, for example: $c_0=4$, $c_1=0$, and $c_{2-5}=1$. FIG. 15 graphically illustrates the above expression for vertical-supplement $V_b(x_2,y_2)_b$, where, as in FIG. 14, $x_2=9$ and $y_2=6$.

Figure 16:
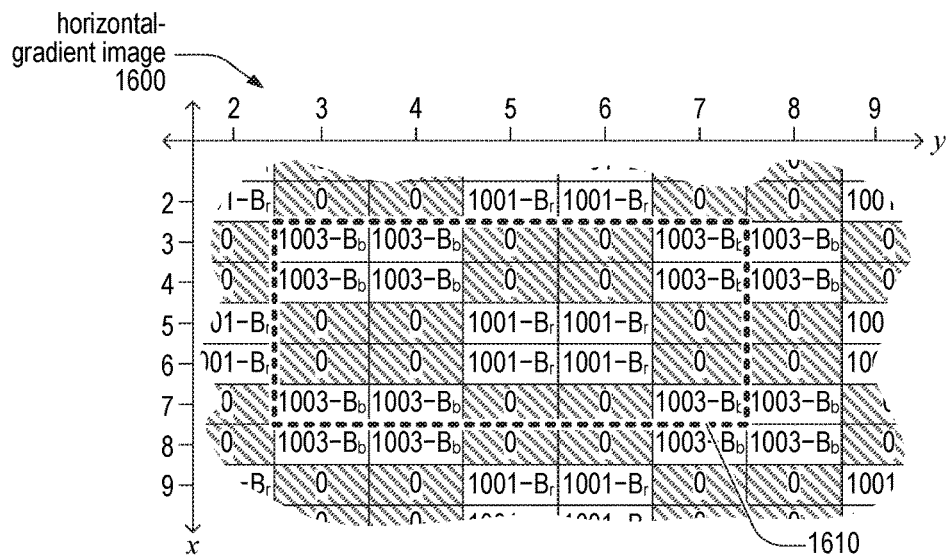
FIGS. 16 and 17 illustrate a horizontal-gradient image and a vertical-gradient image, respectively, each of which are respective examples of the gradient images generated by the image demosaicer of FIG. 7, in an embodiment.
Figure 17:
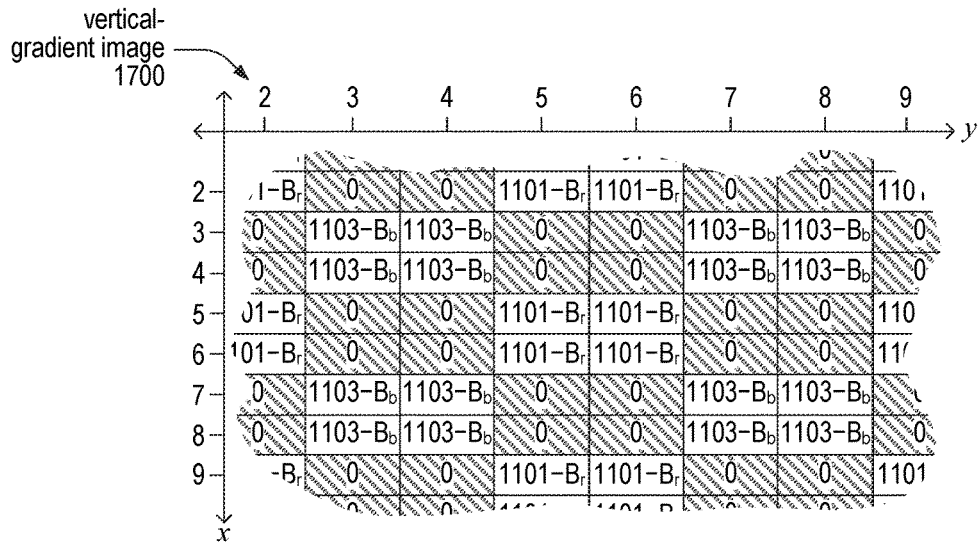

FIGS. 16 and 17 illustrate respective a gradient images 1600 and 1700, which are respective examples of horizontal-gradient image 744H and vertical-gradient image 744V. Horizontal-gradient image 1600 is a difference between refined horizontally-interpolated green channel 1000 and raw image 390. Vertical-gradient image 1700 is a difference between refined vertically-interpolated green channel 1100 and raw image 390. Accordingly, values of gradient images 1600 and 1700 beneath green color filters of CFA 240 equal zero, as both channels 1000 and 1100 include primary pixel-values $B_g$ as such locations. At least one of a color gradient and a luminance gradient may be applied to gradient images 1600 and 1700.

Gradient images 1600 and 1700 may be spatially-averaged, e.g., via a convolution filter, over a group of pixels such that its resolution is less than resolutions of channel 1000, 1100, and raw image 390. For example, gradient images 1600 and 1700 may be averaged over a weighted or unweighted $q_x \times q_y$ kernel, where each of $q_x$ and $q_y$ exceed both m and n, where m×n is the size of the pixel sub-array beneath a same color filter in image sensor 200. For example, FIG. 16 illustrates a kernel 1610, for which $q_x=q_y=5$, that is centered at $(x,y)=(4,4)$. An average horizontal-gradient $\nabla_h$ at coordinate $(x,y)$ may be expressed by equation 5.

$$1600(x,y) = |\langle 1001-B_r \rangle_L + \langle B_g-B_r \rangle_G| + |\langle 1003-B_b \rangle_L + \langle B_g-B_b \rangle_G|, \quad (5)$$

where each right-hand-side term is evaluated at coordinate $(x,y)$, $\langle \cdot \rangle_L$ and $\langle \cdot \rangle_G$ denote, respectively, a local average within the kernel, e.g., kernel 1610, and a global average over the entire raw image 390. Equations 1 and 2 are example expressions of pixel-values 1001 and 1003. Similarly, an average vertical-gradient $\nabla_v$ of gradient image 1700 at coordinate $(x,y)$ may be expressed by equation (6).

$$1700(x,y) = |\langle 1101-B_r \rangle_L + \langle B_g-B_r \rangle_G| + |\langle 1103-B_b \rangle_L + \langle B_g-B_b \rangle_G|. \quad (6)$$

In equation (6), each right-hand-side term is evaluated at coordinate $(x,y)$. Equations 3 and 4 are example expressions of pixel-values 1101 and 1103.

Gradient filter 724 may also suppress noise in gradient images 744H and 744V. For example, gradient filter may reduce pixel values of gradient images 1600 and 1700 at coordinates $(x,y)$ where gradient images 1600 and 1700 differ by less than a predetermined threshold. Such small differences denote noise, and hence do not contribute to accurate gradient values.

Figure 18:
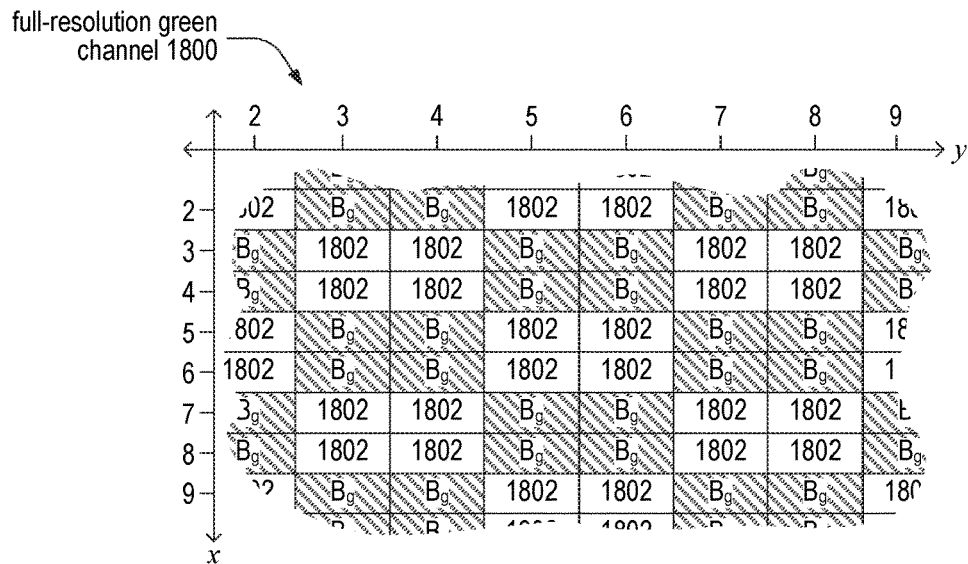
FIG. 18 illustrates a full-resolution green channel that is an average of refined interpolated green channels of FIGS. 10 and 11 weighted by the gradient images of FIGS. 16 and 17, in an embodiment.

FIG. 18 illustrates a full-resolution green channel 1800, which is an example of full-resolution green channel 747. At pixel coordinates $(x,y)_{r,b}$ that is, those corresponding to pixels beneath a non-green color filter, full-resolution green channel 1800 may be an average of refined interpolated green channels of 1000 and 1100, weighted by the gradient images 1700 and 1600 respectively, and normalized by a sum of gradient images 1600 and 1700. Equations 7 and 8 express, respectively, this relationship in general and as applied to channels 1000, 1100 and gradient images 1600 and 1700. In equation 7, $\nabla_h$ and $\nabla_v$ represent gradient images 744H and 744V, respectively. In equation 8, pixel-value 1802(x,y) denotes a pixel-value of full-resolution green channel 1800 at coordinate (x,y).

$$Green_{full\text{-}res} = \frac{GreenRefinedHorizontal \cdot \nabla_v + GreenRefinedVerticle \cdot \nabla_h}{\nabla_h + \nabla_v} \quad (7)$$

$$1802(x, y)_{r,b} = \frac{1000(x, y)_{r,b} \cdot 1700(x, y)_{r,b} + 1100(x, y)_{r,b} \cdot 1600(x, y)_{r,b}}{1600(x, y)_{r,b} + 1700(x, y)_{r,b}} \quad (8)$$

At pixel coordinates $(x,y)_g$ corresponding to green color filters of CFA 240, full-resolution green channel 1800 has pixel-values equal to primary pixel-values $B_g$. For example, at coordinates (x,y)=(4,2), pixel-value 1802(4,2)=$B_g$(4,2).

Chrominance Interpolation

Figure 19:
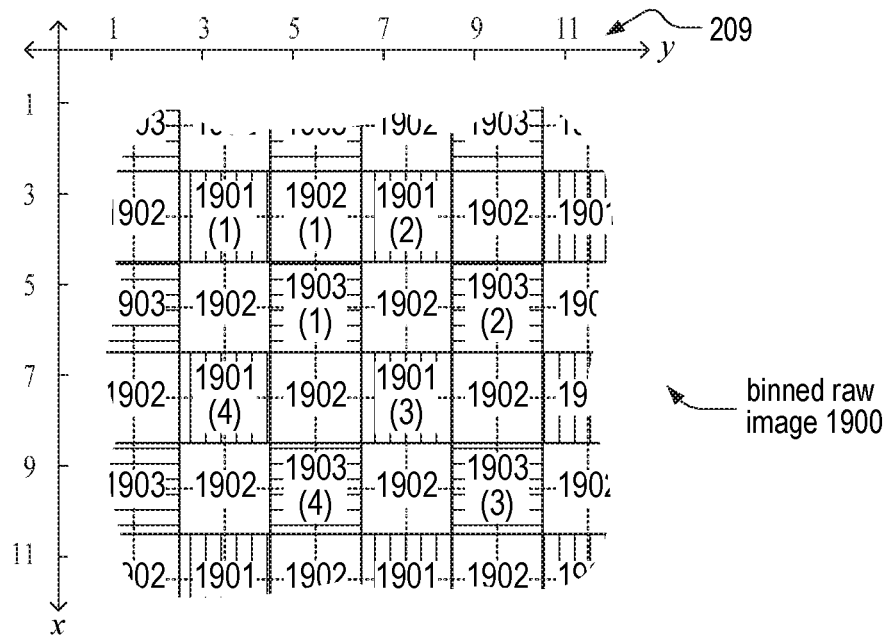
FIG. 19 illustrates a region of a binned raw image, which is generated from the raw image of FIG. 3, in an embodiment.
Figure 20:
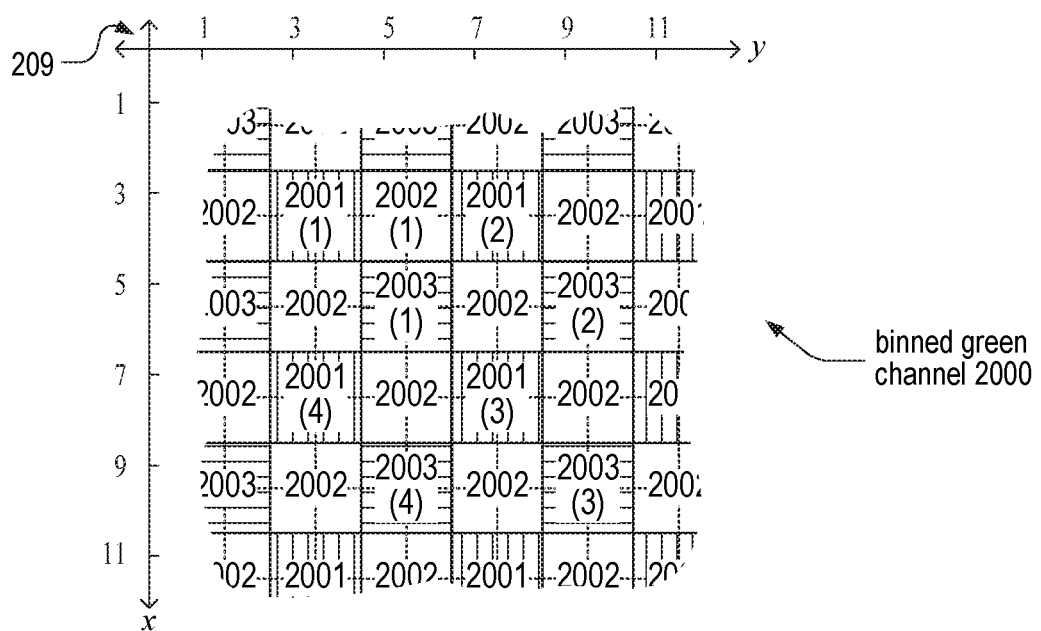
FIG. 20 illustrates a region of a binned green channel, which is generated from the full-resolution green channel of FIG. 18, in an embodiment.

FIG. 19 illustrates a region of a binned raw image 1900, which is generated from raw image 390. FIG. 20 illustrates a region of a binned green channel 2000, which is generated from full-resolution green channel 1800. Binning raw image 390 and full-resolution green channel 1800 enable a chrominance interpolation process with reduced color aliasing and increased speed.

Binned raw image 1900 includes a plurality of binned pixel-values: binned red pixel-values 1901, binned green pixel-values 1902, and binned blue pixel-values 1903. Each binned pixel-value may be an average of pixel-values of raw image 390 beneath a pixel sub-array of pixel array 132A. For example: binned red pixel-value 1901(1) is an average of red primary pixel-values $B_r$ at coordinates (3,3), (3,4), (4,3), and (4,4); binned green pixel-value 1902(1) is an average of green primary pixel-values $B_g$ at coordinates (3,5), (3,6), (4,5), and (4,6); binned blue pixel-value 1903(1) is an average of blue primary pixel-values $B_b$ at coordinates (5,5), (5,6), (6,5), and (6,6).

Binned green channel 2000 includes a plurality of binned green pixel-values 2001, 2002, and 2003 generated by pixel-subarray, of pixel array 132A, located beneath red, green, and blue color filters of CFA 240, respectively. Each binned pixel-value 2001-2003 may be an average of pixel-values of full-resolution green channel 1800 beneath a pixel sub-array of pixel array 132A. For example: binned pixel-value 2001(1) is an average of pixel-values 1802(3,3), 1802(4,4) and primary pixel-values $B_g$(3,4) and $B_g$(4,3); binned green pixel-value 2002(1) is an average of green primary pixel-values $B_g$(3,5), $B_g$(3,6), and pixel-values 1802(4,5) and 1802(4,6); and binned blue pixel-value 2003(1) is an average of blue primary pixel-values $B_b$ at coordinates pixel-values 1802(5,5), 1802(5,6) and primary pixel-values $B_g$(6,5), and $B_g$(6,6).

Figure 21:
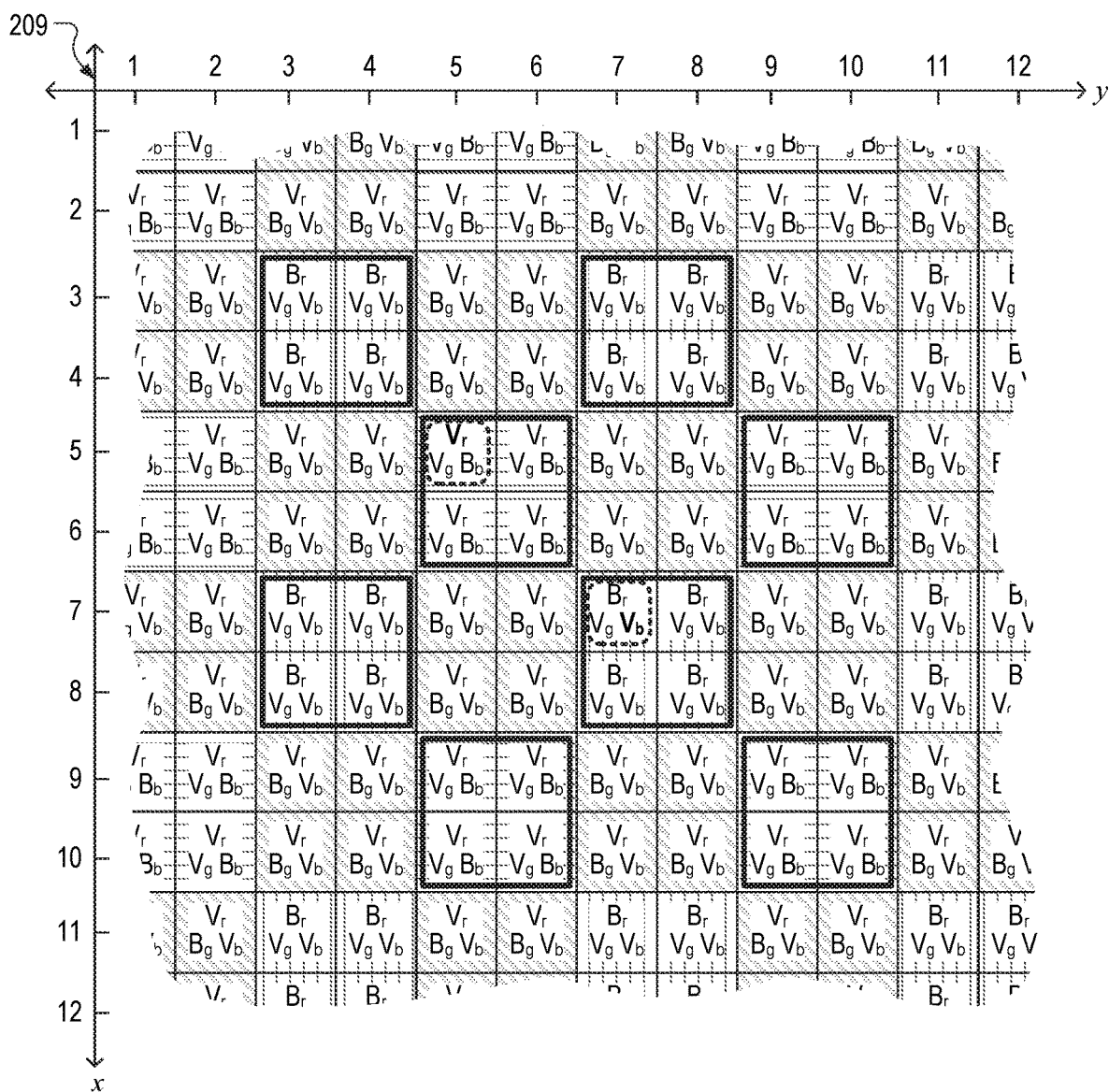
FIG. 21 is the schematic illustration of a region of a demosaiced image, which is an example of the demosaiced image generated by the image demosaicer of FIG. 7, in an embodiment.

FIG. 21 is the schematic illustration of a region of a demosaiced image 2100 that shows one primary pixel-value $B_a$ and two non-primary pixel-values $V_a$ corresponding to a location of each pixel 132 of pixel array 132A. The fill-pattern at each coordinate (x,y) indicates the type of color filter of CFA 240 aligned with the pixel 132 at the coordinate: vertical lines denote red, diagonal lines denote green, and horizontal lines denote blue. Demosaiced image 2100 is an example of demosaiced image 798 produced by image demosaicer 700, FIG. 7.

The following examples illustrate computation of a blue pixel-value at a coordinate beneath a red color filter and red pixel-value at a coordinate beneath a blue color filter. The red color filter is located at (x,y)=(7,7); the blue color filter is located at (x,y)=(5,5). Pixel-values at these coordinates are enclosed by a dashed box in FIG. 21, and pixel-values therein computed below are presented in bold letters. Equations below refer to pixel-values of binned raw image 1900 and binned green channel 2000, the locations of which are indicated by solid-line boxes in FIG. 21.

At pixel coordinate (x,y)=(5,5), demosaiced image 2100 includes red pixel-value $I_r$(5,5), green pixel-value $I_g$(5,5), blue primary pixel-value $B_b$(5,5). Green pixel-value $I_g$(5,5) equals pixel-value 1802(5,5) of full-resolution green channel 1800, FIG. 18.

Red pixel-value $I_r$(5,5) may be computed by chrominance interpolation equations (21r-1) through (21r-8). Per equation (21r-1), $R_{avg}$ is an average of binned red pixel-values 1901 (1-4) of binned raw image 1900. Per equation (21r-2), $G_{avg}$ is an average of binned pixel-values 2001(1-4) of binned green channel 2000, which correspond to pixels 132 beneath a green color filter of CFA 240. Per equation (21r-3), $RG_{avg}$ is an average of an addend-by-addend multiplication of $R_{avg}$ and $G_{avg}$. Per equation (21r-4), $GG_{avg}$ is an average of an addend-by-addend multiplication of $G_{avg}$ and $G_{avg}$. Equations (21r-5) through (21r-7) derive a weight based on a covariance and variance between $R_{avg}$ and $G_{avg}$.

$$R_{avg} = \frac{1}{4}(1901(1) + 1902(2) + 1901(3) + 1901(4)) \quad (21r\text{-}1)$$

$$G_{avg} = \frac{1}{4}(2001(1) + 2001(2) + 2001(3) + 2001(4)) \quad (21r\text{-}2)$$

$$RG_{avg} = \frac{1}{4}\left(\begin{array}{c}1901(1) \cdot 2001(1) + 1901(2) \cdot 2001(2) + \\ 1901(3) \cdot 2001(3) + 1901(4) \cdot 2001(4)\end{array}\right) \quad (21r\text{-}3)$$

$$GG_{avg} = \frac{1}{4}(2001(1)^2 + 2001(2)^2 + 2001(3)^2 + 2001(4)^2) \quad (21r\text{-}4)$$

$$\text{covariance} = RG_{avg} - R_{avg}G_{avg} \quad (21r\text{-}5)$$

$$\text{variance} = GG_{avg} - G_{avg}^2 \quad (21r\text{-}6)$$

$$\text{weight} = \text{covariance}/\text{variance} \quad (21r\text{-}7)$$

$$I_r(5, 5) = (I_g(5, 5) - G_{avg}) \cdot \text{weight} + R_{avg} \quad (21r\text{-}8)$$

Red-channel interpolator 728 may generate red pixel-values $I_r(x,y)$ for all coordinates $(x,y)_{\alpha \ne r}$ of demosaiced image 2100, where red pixel-values $I_r(x,y)$ comprise an example of full-resolution red channel 748.

At pixel coordinate (x,y)=(7,7), demosaiced image 2100 includes red primary pixel-value $B_r$(7,7) of raw image 390, green pixel-value $I_g$(7,7), and blue pixel-value $I_b$(7,7). Green pixel-value $I_g$(7,7) equals pixel-value 1802(7,7) of full-resolution green channel 1800, FIG. 18.

Blue pixel-value $I_b$(7,7) may be computed by chrominance interpolation equations (21b-1) through (21b-8), e.g., by blue-channel interpolator 729 of image demosaicer 700. Per equation (21b-1), $B_{avg}$ is an average of binned blue pixel-values 1903(1-4) of binned raw image 1900. Per equation (21b-2), $G_{avg}$ is an average of binned pixel-values 2003(1-4) of binned green channel 2000, which correspond to pixels 132 beneath a green color filter of CFA 240. Per equation (21b-3), $BG_{avg}$ is an average of an addend-by-addend multiplication of $B_{avg}$ and $G_{avg}$. Per equation (21b-4), $GG_{avg}$ is an average of an addend-by-addend multiplication of $G_{avg}$ and $G_{avg}$. Equations (21b-5) through (21b-8) derive a weight based on a covariance and variance between $B_{avg}$ and $G_{avg}$.

$$B_{avg} = \frac{1}{4}(1903(1) + 1903(2) + 1903(3) + 1903(4)) \quad (21b\text{-}1)$$

$$G_{avg} = \frac{1}{4}(2003(1) + 2003(2) + 2003(3) + 2003(4)) \quad (21b\text{-}2)$$

$$BG_{avg} = \frac{1}{4}\begin{pmatrix} 1903(1) \cdot 2003(1) + 1903(2) \cdot 2003(2) + \\ 1903(3) \cdot 2003(3) + 1903(4) \cdot 2003(4) \end{pmatrix} \quad (21b\text{-}3)$$

$$GG_{avg} = \frac{1}{4}(2003(1)^2 + 2003(2)^2 + 2003(3)^2 + 2003(4)^2) \quad (21b\text{-}4)$$

$$\text{covariance} = BG_{avg} - B_{avg}G_{avg} \quad (21b\text{-}5)$$

$$\text{variance} = GG_{avg} - G_{avg}^2 \quad (21b\text{-}6)$$

$$\text{weight} = \text{covariance}/\text{variance} \quad (21b\text{-}7)$$

$$I_b(7,7) = (I_g(7,7) - G_{avg}) \cdot \text{weight} + B_{avg} \quad (21b\text{-}8)$$

Blue-channel interpolator 729 may generate blue pixel-values $I_b(x,y)$ for all coordinates $(x,y)_{\alpha \neq b}$ of demosaiced image 2100, where blue pixel-values $I_b(x,y)$ comprise an example of full-resolution blue channel 749.

In an embodiment, the weight of equations (21r-8) and (21b-8) are determined at least in part by applying a guided filter to full-resolution green channel 1800 and raw image 390, and/or images derived therefrom. The guided filter may be applied to full-resolution green channel 1800 and red channel 400 and blue channel 600 of raw image 390, for example, such that weights are derived from a correlation between channels 1800, 400, and 600. Use of a guided filter reduces color aliasing that may arise during chrominance interpolation. A guided filter is, for example, one described in K. He, J. Sun and X. Tang, "Guided Image Filtering," in *IEEE Transactions on Pattern Analysis and Machine Intelligence*, vol. 35, no. 6, pp. 1397-1409, June 2013.

Figure 22:
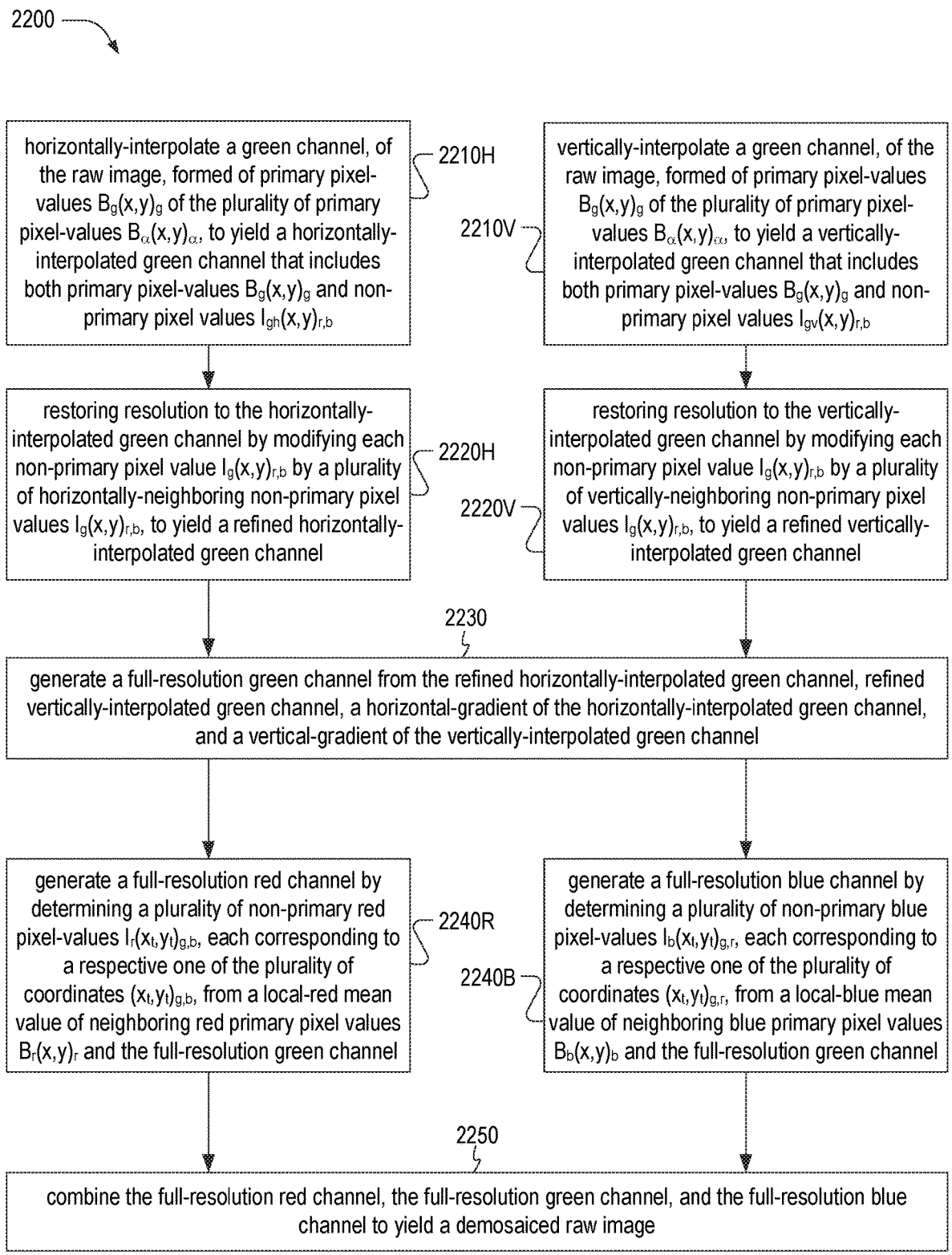
FIG. 22 is a flowchart illustrating a method for demosaicing a raw image, in an embodiment.

FIG. 22 is a flowchart illustrating a method 2200 for demosaicing a raw image captured by an image sensor that includes a pixel array and a Bayer-pattern CFA having a plurality of red color filters $CF_r$, green color filters $CF_g$, and blue color filters $CF_b$ each covering a respective one of a plurality of m×n pixel sub-arrays of the pixel array. The pixel array includes a plurality of pixels $p(x,y)_\alpha$ located at a respective one of a plurality of coordinates $(x,y)_\alpha$ and beneath a color filter $CF_\alpha$. Each pixel $p(x,y)_\alpha$ generates a respective one of a plurality of primary pixel-values $B_\alpha(x,y)_\alpha$, where $\alpha$ is one of r, g, and b. Method 2200 may be implemented by image demosaicer 700 processing a raw image 390, e.g., by microprocessor 702 executing computer-readable instructions of software 720. Method 2200 includes at least one of steps 2210H, 2210V, 2220H, 2220V, 2230, 2240R, 2240B, and 2250.

Step 2210H includes horizontally-interpolating a green channel, of the raw image, formed of primary pixel-values $B_g(x,y)_g$ of the plurality of primary pixel-values $B_\alpha(x,y)_\alpha$, to yield a horizontally-interpolated green channel that includes both primary pixel-values $B_g(x,y)_g$ and non-primary pixel-values $I_{gh}(x,y)_{r,b}$. In an example of step 2210H, green-channel interpolator 722 interpolates green channel 500 to yield horizontally-interpolated green channel 800. For example, green-channel interpolator 722 may interpolate a logarithm of green channel 500 to yield a logarithm of channel 800, and also apply an inverse logarithmic function thereto to yield horizontally-interpolated green channel 800

Step 2210V includes vertically-interpolating a green channel, of the raw image, formed of primary pixel-values $B_g(x,y)_g$ of the plurality of primary pixel-values $B_\alpha(x,y)_\alpha$, to yield a vertically-interpolated green channel that includes both primary pixel-values $B_g(x,y)_g$ and non-primary pixel-values $I_{gv}(x,y)_{r,b}$. In an example of step 2210V, green-channel interpolator 722 interpolates green channel 500 to yield vertically-interpolated green channel 900. For example, green-channel interpolator 722 may interpolate a logarithm of green channel 500 to yield a logarithm of channel 900, and also apply an inverse logarithmic function thereto to yield vertically-interpolated green channel 900.

Step 2220H includes restoring resolution to the horizontally-interpolated green channel by modifying each non-primary pixel-value $I_{gh}(x,y)_{r,b}$ by a plurality of horizontally-neighboring non-primary pixel-values $I_{gh}(x,y)_{r,b}$, to yield a refined horizontally-interpolated green channel. In an example of step 2220H, resolution restorer 723 generates refined horizontally-interpolated green channel 1000 from horizontally-interpolated green channel 800.

Step 2220V includes restoring resolution to the vertically-interpolated green channel by modifying each non-primary pixel-value $I_{gh}(x,y)_{r,b}$ by a plurality of vertically-neighboring non-primary pixel-values $I_{gh}(x,y)_{r,b}$, to yield a refined vertically-interpolated green channel. In an example of step 2220V, resolution restorer 723 generates refined vertically-interpolated green channel 1100 from vertically-interpolated green channel 900.

Step 2230 includes generating a full-resolution green channel from the horizontally-interpolated green channel, vertically-interpolated green channel, a horizontal-gradient of the horizontally-interpolated green channel, and a vertical-gradient of the vertically-interpolated green channel. In an example of step 2230, combiner 727 generates full-resolution green channel 1800 from refined horizontally-interpolated green channel 1000 and refined vertically-interpolated green channel 1100.

Step 2240R includes generating a full-resolution red channel by determining a plurality of non-primary red pixel-values $I_r(x_r,y_t)_{g,b}$, each corresponding to a respective one of the plurality of coordinates $(x_r,y_t)_{g,b}$, from a local-red mean value of neighboring red primary pixel-values $B_r(x,y)_r$ and the full-resolution green channel. In an example of step 2240H, red-channel interpolator 728 generates red pixel-values $I_r(x,y)$ of demosaiced image 2100, for example, by executing one or more of equations (21r-1)-(21r-8). As previously stated, an example of full-resolution red channel 748 includes red pixel-values $I_r(x,y)$.

Step 2240B includes generating a full-resolution blue channel by determining a plurality of non-primary blue pixel-values $I_b(x_r,y_t)_{g,r}$, each corresponding to a respective one of the plurality of coordinates $(x_r,y_t)_{g,r}$, from a local-blue mean value of neighboring blue primary pixel-values $B_b(x,y)_b$ and the full-resolution green channel. In an example of step 2240B, blue-channel interpolator 729 generates blue pixel-values $I_b(x,y)$ of demosaiced image 2100, for example, by executing one or more of equations (21b-1)-(21b-8). As previously stated, an example of full-resolution blue channel 749 includes blue pixel-values $I_b(x,y)$.

Step 2250 includes combining the full-resolution red channel, the full-resolution green channel, and the full-resolution blue channel to yield a demosaiced raw image. In an example of step 2250, combiner 732 combines full-resolution red channel 748, full-resolution green channel 1800, and full-resolution blue channel 749 to yield demosaiced image 2100.

Combinations of Features

Features described above as well as those claimed below may be combined in various ways without departing from the scope hereof. The following examples illustrate some possible, non-limiting combinations:

(A1) denotes a method for demosaicing a raw image captured by an image sensor. The image sensor includes a pixel array and a Bayer-pattern color-filter array (CFA) having a plurality of red color filters $CF_r$, green color filters $CF_g$, and blue color filters $CF_b$ each covering a respective one of a plurality of pixel sub-arrays of the pixel array. The pixel array including a plurality of pixels $p(x,y)_\alpha$ located at a respective one of a plurality of coordinates $(x,y)_\alpha$, and beneath a color filter $CF_\alpha$, and each generating a respective one of a plurality of primary pixel-values $B_\alpha(x,y)_\alpha$, where $\alpha$ is one of r, g, and b. Method (A1) includes the following steps denoted 1-8:

(1) horizontally-interpolating a green channel, of the raw image, formed of primary pixel-values $B_g(x,y)_g$ of the plurality of primary pixel-values $B_\alpha(x,y)_\alpha$, to yield a horizontally-interpolated green channel that includes both primary pixel-values $B_g(x,y)_g$ and non-primary pixel-values $I_{gh}(x,y)_{r,b}$;

(2) modifying each non-primary pixel-value $I_{gh}(x,y)_{r,b}$ by a plurality of horizontally-neighboring non-primary pixel-values $I_{gh}(x,y)_{r,b}$, to yield a refined horizontally-interpolated green channel;

(3) vertically-interpolating the green channel to yield a vertically-interpolated green channel that includes both primary pixel-values $B_g(x,y)_g$ and non-primary pixel-values $I_{gv}(x,y)_{r,b}$;

(4) modifying each non-primary pixel-value $I_{gv}(x,y)_{r,b}$ by a plurality of vertically-neighboring non-primary pixel-values $I_{gv}(x,y)_{r,b}$, to yield a refined vertically-interpolated green channel;

(5) generating a full-resolution green channel from the refined horizontally-interpolated green channel, refined vertically-interpolated green channel, a horizontal-gradient of the horizontally-interpolated green channel, and a vertical-gradient of the vertically-interpolated green channel;

(6) generating a full-resolution red channel by determining a plurality of non-primary red pixel-values $I_r(x_t,y_t)_{g,b}$, each corresponding to a respective one of the plurality of coordinates $(x_t,y_t)_{g,b}$, from a local-red mean value of neighboring red primary pixel-values $B_r(x,y)_r$ and the full-resolution green channel;

(7) generating a full-resolution blue channel by determining a plurality of non-primary blue pixel-values $I_b(x_t,y_t)_{g,r}$, each corresponding to a respective one of the plurality of coordinates $(x_t,y_t)_{g,r}$, from a local-blue mean value of neighboring blue primary pixel-values $B_b(x,y)_b$ and the full-resolution green channel; and (8) combining the full-resolution red channel, the full-resolution green channel, and the full-resolution blue channel to yield a demosaiced raw image.

(A2) In any method denoted by (A1), both the horizontally-interpolating the green channel and the vertically-interpolating the green channel may include linearly interpolating a logarithm of primary pixel-values $B_g(x,y)_g$.

(A3) In any method denoted by one of (A1) and (A2), in which each of the plurality of pixel sub-arrays having dimensions m×n, the step of modifying each non-primary pixel-value $I_{gh}(x,y)_{r,b}$ may include, for each pixel $p(x,y)$ beneath a red color filter of a target pixel sub-array, of the plurality of pixel sub-arrays, located between (i) a pair of horizontally-neighboring source pixel sub-arrays each beneath respective red color filters, of the CFA and horizontally collinear with the target pixel sub-array: determining a red horizontal-supplement $H_r(x,y)$ as a linear combination of $B_r(x,y)_r$, primary pixel-values $B_r(x,y_1)_r$ of horizontally-adjacent pixels $p(x,y_1)$ beneath the target pixel sub-array, and primary pixel-values $B_r(x,y_2)_r$ of horizontally-collinear pixels $p(x,y_2)$ beneath red color filters of the pair of horizontally-neighboring source pixel sub-arrays, where $|y-y_1|<n$ and $|y-y_2|\geq n$.

(A4) In any method denoted by one of (A1) through (A3), in which each of the plurality of pixel sub-arrays having dimensions m×n, the step of modifying each non-primary pixel-value $I_{gv}(x,y)_{r,b}$ may include, for each pixel $p(x,y)$ beneath a red color filter of a target pixel sub-array, of the plurality of pixel sub-arrays, located between a pair of vertically-neighboring source pixel sub-arrays each beneath a respective red color filter of the CFA and vertically collinear with the target pixel sub-array: determining a red vertical-supplement $V_r(x,y)$ as a linear combination of $B_r(x,y)_r$, primary pixel-values $B_r(x_1,y)_r$ of vertically-adjacent pixels $p(x_1,y)$ beneath the target pixel sub-array, and primary pixel-values $B_r(x_2,y)_r$ of vertically-collinear pixels $p(x_2,y)$ beneath red color filters of the pair of vertically-neighboring source pixel sub-arrays, where $|x-x_1|<m$ and $|x-x_2|\geq m$.

(A5) Any method denoted by one of (A1) through (A4) may further include determining the horizontal-gradient and the vertical-gradient by: (a) subtracting the raw image from the refined horizontally-interpolated green channel, and (b) subtracting the raw image from the refined vertical-interpolated green channel.

(A6) In any method denoted by one of (A1) through (A5), at least one of (i) generating the full-resolution red channel and (ii) generating the full-resolution blue channel may include binning the full-resolution green channel, and binning the raw image.

(A7) In any method denoted by (A6), the at least one of (i) generating the full-resolution red channel and (ii) generating the full-resolution blue channel may include: computing a variance of the binned full-resolution green channel and a covariance of (a) the binned full-resolution green channel and (b) the binned raw image.

(A8) In any method denoted by one of (A6) and (A7): (a) binning of the full-resolution green channel may yield a binned green channel that includes a plurality of binned green pixel-values; and (b) binning the raw image may yield a binned raw image that includes a plurality of binned red pixel-values based on the plurality of primary pixel-values $B_r$, and a plurality of binned blue pixel-values based on the plurality of primary pixel-values $B_b$, the local-red mean value being an average of binned red pixel-values, the local-blue mean value being an average of binned blue pixel-values.

(A9) In any method denoted by (A8), each of the plurality of non-primary red pixel-values $I_r(x_t,y_t)_{g,b}$ may have a magnitude that increases in response to an increasing covariance of the average of binned red pixel-values and an average of binned green pixel-values; and each of the plurality of non-primary blue pixel-values $I_b(x_t,y_t)_{g,r}$ may have a magnitude that increases in response to an increasing covariance of the average of binned blue pixel-values and the average of binned green pixel-values.

(A10) In any method denoted by one of (A8) and (A9), each of the plurality of non-primary red pixel-values $I_r(x_t,y_t)_{g,b}$ may have a magnitude that decreases in response to an increasing variance of the average of binned green pixel-values; and each of the plurality of non-primary blue pixel-values $I_b(x_t,y_t)_{g,r}$ may have a magnitude that decreases in response to an increasing variance of the average of binned green pixel-values.

An image demosaicer (B1) for demosaicing a raw image includes a memory and a microprocessor. The raw image is captured by the image sensor of the aforementioned method. The memory stores non-transitory computer-readable instructions and is adapted to store the raw image. The microprocessor is adapted to execute the instructions to execute any of the methods denoted by (A1) through (A10).

Changes may be made in the above image demosaicer and demosaicing methods without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present image demosaicer and demosaicing methods, which, as a matter of language, might be said to fall therebetween.

What is claimed is:

1. A method for demosaicing a raw image captured by an image sensor that includes a pixel array and a Bayer-pattern color-filter array (CFA) having a plurality of red color filters $CF_r$, green color filters $CF_g$, and blue color filters $CF_b$ each covering a respective one of a plurality of pixel sub-arrays of the pixel array, the pixel array including a plurality of pixels $p(x,y)_\alpha$ located at a respective one of a plurality of coordinates $(x,y)_\alpha$, and beneath a color filter $CF_\alpha$, and each generating a respective one of a plurality of primary pixel-values $B_\alpha(x,y)_\alpha$, where $\alpha$ is one of r, g, and b, the method comprising:
horizontally-interpolating a green channel, of the raw image, formed of primary pixel-values $B_g(x,y)_g$ of the plurality of primary pixel-values $B_\alpha(x,y)_\alpha$, to yield a horizontally-interpolated green channel that includes both primary pixel-values $B_g(x,y)_g$ and non-primary pixel-values $I_{gh}(x,y)_{r,b}$;
modifying each non-primary pixel-value $I_{gh}(x,y)_{r,b}$ by a plurality of horizontally-neighboring non-primary pixel-values $I_{gh}(x,y)_{r,b}$, to yield a refined horizontally-interpolated green channel;
vertically-interpolating the green channel to yield a vertically-interpolated green channel that includes both primary pixel-values $B_g(x,y)_g$ and non-primary pixel-values $I_{gv}(x,y)_{r,b}$;
modifying each non-primary pixel-value $I_{gv}(x,y)_{r,b}$ by a plurality of vertically-neighboring non-primary pixel-values $I_{gv}(x,y)_{r,b}$, to yield a refined vertically-interpolated green channel;
generating a full-resolution green channel from the refined horizontally-interpolated green channel, refined vertically-interpolated green channel, a horizontal-gradient of the horizontally-interpolated green channel, and a vertical-gradient of the vertically-interpolated green channel;
generating a full-resolution red channel by determining a plurality of non-primary red pixel-values $I_r(x_t,y_t)_{g,b}$, each corresponding to a respective one of the plurality of coordinates $(x_t,y_t)_{g,b}$, from a local-red mean value of neighboring red primary pixel-values $B_r(x,y)_r$ and the full-resolution green channel;
generating a full-resolution blue channel by determining a plurality of non-primary blue pixel-values $I_b(x_t,y_t)_{g,r}$, each corresponding to a respective one of the plurality of coordinates $(x_t,y_t)_{g,r}$, from a local-blue mean value of neighboring blue primary pixel-values $B_b(x,y)_b$ and the full-resolution green channel; and
combining the full-resolution red channel, the full-resolution green channel, and the full-resolution blue channel to yield a demosaiced raw image.

2. The method of claim 1, both the horizontally-interpolating the green channel and the vertically-interpolating the green channel comprising linearly interpolating a logarithm of primary pixel-values $B_g(x,y)_g$.

3. The method of claim 1, each of the plurality of pixel sub-arrays having dimensions m×n, the step of modifying each non-primary pixel-value $I_{gh}(x,y)_{r,b}$ comprising:
for each pixel $p(x,y)$ beneath a red color filter of a target pixel sub-array, of the plurality of pixel sub-arrays, located between (i) a pair of horizontally-neighboring source pixel sub-arrays each beneath respective red color filters, of the CFA and horizontally collinear with the target pixel sub-array,
determining a red horizontal-supplement $H_r(x,y)$ as a linear combination of $B_r(x,y)_r$, primary pixel-values $B_r(x,y_1)_r$ of horizontally-adjacent pixels $p(x,y_1)$ beneath the target pixel sub-array, and primary pixel-values $B_r(x,y_2)_r$ of horizontally-collinear pixels $p(x,y_2)$ beneath red color filters of the pair of horizontally-neighboring source pixel sub-arrays, where $|y-y_1|<n$ and $|y-y_2| \geq n$.

4. The method of claim 1, each of the plurality of pixel sub-arrays having dimensions m×n, the step of modifying each non-primary pixel-value $I_{gv}(x,y)_{r,b}$, comprising:
for each pixel $p(x,y)$ beneath a red color filter of a target pixel sub-array, of the plurality of pixel sub-arrays, located between a pair of vertically-neighboring source pixel sub-arrays each beneath a respective red color filter of the CFA and vertically collinear with the target pixel sub-array,
determining a red vertical-supplement $V_r(x,y)$ as a linear combination of $B_r(x,y)_r$, primary pixel-values $B_r(x_1,y)_r$ of vertically-adjacent pixels $p(x_1,y)$ beneath the target pixel sub-array, and primary pixel-values $B_r(x_2,y)_r$ of vertically-collinear pixels $p(x_2,y)$ beneath red color filters of the pair of vertically-neighboring source pixel sub-arrays, where $|x-x_1|<m$ and $|x-x_2| \geq m$.

5. The method of claim 1, further comprising determining the horizontal-gradient and the vertical-gradient by:
subtracting the raw image from the refined horizontally-interpolated green channel, and
subtracting the raw image from the refined vertical-interpolated green channel.

6. The method of claim 1, at least one of (i) generating the full-resolution red channel and (ii) generating the full-resolution blue channel including:
binning the full-resolution green channel, and
binning the raw image.

7. The method of claim 6, the at least one of (i) generating the full-resolution red channel and (ii) generating the full-resolution blue channel including: computing a variance of the binned full-resolution green channel and a covariance of (a) the binned full-resolution green channel and (b) the binned raw image.

8. The method of claim 6,
binning of the full-resolution green channel yielding a binned green channel that includes a plurality of binned green pixel-values,
binning the raw image yielding a binned raw image that includes a plurality of binned red pixel-values based on the plurality of primary pixel-values $B_r$ and a plurality of binned blue pixel-values based on the plurality of primary pixel-values $B_b$, the local-red mean value being an average of binned red pixel-values, the local-blue mean value being an average of binned blue pixel-values.

9. The method of claim 8,
each of the plurality of non-primary red pixel-values $I_r(x_r,y_t)_{g,b}$ having a magnitude that increases in response to an increasing covariance of the average of binned red pixel-values and an average of binned green pixel-values; and
each of the plurality of non-primary blue pixel-values $I_b(x_r,y_t)_{g,r}$ having a magnitude that increases in response to an increasing covariance of the average of binned blue pixel-values and the average of binned green pixel-values.

10. The method of claim 8,
each of the plurality of non-primary red pixel-values $I_r(x_r,y_t)_{g,b}$ having a magnitude that decreases in response to an increasing variance of the average of binned green pixel-values; and
each of the plurality of non-primary blue pixel-values $I_b(x_r,y_t)_{g,r}$ having a magnitude that decreases in response to an increasing variance of the average of binned green pixel-values.

11. An image demosaicer for demosaicing a raw image captured by an image sensor that includes a pixel array and a Bayer-pattern color-filter array (CFA) having a plurality of red color filters $CF_r$, green color filters $CF_g$, and blue color filters $CF_b$ each covering a respective one of a plurality of m×n pixel sub-arrays of the pixel array, the pixel array including a plurality of pixels $p(x,y)_\alpha$ located at a respective one of a plurality of coordinates $(x,y)_\alpha$, and beneath a color filter $CF_\alpha$, and each generating a respective one of a plurality of primary pixel-values $B_\alpha(x,y)_\alpha$, where $\alpha$ is one of r, g, and b:
a memory storing non-transitory computer-readable instructions and adapted to store the raw image;
a microprocessor adapted to execute the instructions to:
horizontally-interpolate a green channel, of the raw image, formed of primary pixel-values $B_g(x,y)_g$ of the plurality of primary pixel-values $B_\alpha(x,y)_\alpha$, to yield a horizontally-interpolated green channel that includes both primary pixel-values $B_g(x,y)_g$ and non-primary pixel-values $I_{gh}(x,y)_{r,b}$;
modify each non-primary pixel-value $I_{gh}(x,y)_{r,b}$ by a plurality of horizontally-neighboring non-primary pixel-values $I_{gh}(x,y)_{r,b}$, to yield a refined horizontally-interpolated green channel;
vertically-interpolate the green channel to yield a vertically-interpolated green channel that includes both primary pixel-values $B_g(x,y)_g$ and non-primary pixel-values $I_{gv}(x,y)_{r,b}$;
modify each non-primary pixel-value $I_{gv}(x,y)_{r,b}$ by a plurality of vertically-neighboring non-primary pixel-values $I_{gv}(x,y)_{r,b}$, to yield a refined vertically-interpolated green channel;
generate a full-resolution green channel from the refined horizontally-interpolated green channel, refined vertically-interpolated green channel, a horizontal-gradient of the horizontally-interpolated green channel, and a vertical-gradient of the vertically-interpolated green channel;
generate a full-resolution red channel by determining a plurality of non-primary red pixel-values $I_r(x_r,y_t)_{g,b}$, each corresponding to a respective one of the plurality of coordinates $(x_r,y_t)_{g,b}$, from a local-red mean value of neighboring red primary pixel-values $B_r(x,y)_r$ and the full-resolution green channel;
generate a full-resolution blue channel by determining a plurality of non-primary blue pixel-values $I_b(x_r,y_t)_{g,r}$, each corresponding to a respective one of the plurality of coordinates $(x_r,y_t)_{g,r}$, from a local-blue mean value of neighboring blue primary pixel-values $B_b(x,y)_b$ and the full-resolution green channel; and
combine the full-resolution red channel, the full-resolution green channel, and the full-resolution blue channel to yield a demosaiced raw image.

12. The image demosaicer of claim 11, the microprocessor being further adapted to execute the instructions to, when both horizontally-interpolating the green channel and vertically-interpolating the green channel, linearly interpolate a logarithm of primary pixel-values $B_g(x,y)$.

13. The image demosaicer of claim 11, each of the plurality of pixel sub-arrays having dimensions m×n, when restoring resolution to the horizontally-interpolated green channel and for each pixel p(x,y) beneath a red color filter of a target pixel sub-array, of the plurality of pixel sub-arrays, located between (i) a pair of horizontally-neighboring source pixel sub-arrays each beneath respective red color filters, of the CFA and horizontally collinear with the target pixel sub-array, the microprocessor being further adapted to execute the instructions to:
determine a red horizontal-supplement $H_r(x,y)$ as a linear combination of $B_r(x,y)_r$, primary pixel-values $B_r(x,y_1)_r$ of horizontally-adjacent pixels $p(x,y_1)$ beneath the target pixel sub-array, and primary pixel-values $B_r(x,y_2)_r$ of horizontally-collinear pixels $p(x,y_2)$ beneath red color filters of the pair of horizontally-neighboring source pixel sub-arrays, where $|y-y_1|<n$ and $|y-y_2|\geq n$.

14. The image demosaicer of claim 11, each of the plurality of pixel sub-arrays having dimensions m×n, when restoring resolution to the vertically-interpolated green channel and for each pixel p(x,y) beneath a red color filter of a target pixel sub-array, of the plurality of pixel sub-arrays, located between (i) a pair of vertically-neighboring source pixel sub-arrays each beneath respective red color filters, of the CFA and vertically collinear with the target pixel sub-array, the microprocessor being further adapted to execute the instructions to:
determine a red vertical-supplement $V_r(x,y)$ as a linear combination of $B_r(x,y)$, primary pixel-values $B_r(x_1,y)$ of vertically-adjacent pixels $p(x_1,y)$ beneath the target pixel sub-array, and primary pixel-values $B_r(x_2,y)$ of vertically-collinear pixels $p(x_2,y)$ beneath red color filters of the pair of vertically-neighboring source pixel sub-arrays, where $|x-x_1|<m$ and $|x-x_2|\geq m$.

15. The image demosaicer of claim 11, the microprocessor being further adapted to execute the instructions to determine the horizontal-gradient and the vertical-gradient by:
subtracting the raw image from the refined horizontally-interpolated green channel; and
subtracting the raw image from the refined vertical-interpolated green channel.

16. The image demosaicer of claim 11, the microprocessor being further adapted to execute the instructions to, when at least one of (i) generating the full-resolution red channel and (ii) generating the full-resolution blue channel:
bin the full-resolution green channel, and
bin the raw image.

17. The image demosaicer of claim 16, the microprocessor being further adapted to execute the instructions to, when generating a full-resolution red channel, compute a variance of the binned full-resolution green channel and a covariance of (a) the binned full-resolution green channel and (b) the binned raw image.

18. The image demosaicer of claim 16,
binning of the full-resolution green channel yielding a binned green channel that includes a plurality of binned green pixel-values,
binning the raw image yielding a binned raw image that includes a plurality of binned red pixel-values based on the plurality of primary pixel-values $B_r$ and a plurality of binned blue pixel-values based on the plurality of primary pixel-values $B_b$, the local-red mean value being an average of binned red pixel-values, the local-blue mean value being an average of binned blue pixel-values.

19. The image demosaicer of claim 18,
each of the plurality of non-primary red pixel-values $I_r(x_t,y_t)_{g,b}$ having a magnitude that increases in response to an increasing covariance of the average of binned red pixel-values and the average of binned green pixel-values; and
each of the plurality of non-primary blue pixel-values $I_b(x_t,y_t)_{g,r}$ having a magnitude that increases in response to an increasing covariance of the average of binned blue pixel-values and the average of binned green pixel-values.

20. The image demosaicer of claim 18,
each of the plurality of non-primary red pixel-values $I_r(x_t,y_t)_{g,b}$ having a magnitude that decreases in response to an increasing variance of the average of binned green pixel-values; and
each of the plurality of non-primary blue pixel-values $I_b(x_t,y_t)_{g,r}$ having a magnitude that decreases in response to an increasing variance of the average of binned green pixel-values.

\* \* \* \* \*